(12) United States Patent
Siram et al.

(10) Patent No.: US 9,083,668 B2
(45) Date of Patent: Jul. 14, 2015

(54) ADAPTOR BASED COMMUNICATIONS SYSTEMS, APPARATUS, AND METHODS

(71) Applicant: Amatra Technologies, Inc., Austin, TX (US)

(72) Inventors: Kishan Siram, Cedar Park, TX (US); Nanditha Siram, Cedar Park, TX (US)

(73) Assignee: Amatra Technologies, Inc., Austin, TX (US)

( * ) Notice: Subject to any disclaimer, the term of this patent is extended or adjusted under 35 U.S.C. 154(b) by 301 days.

(21) Appl. No.: 13/837,386

(22) Filed: Mar. 15, 2013

(65) Prior Publication Data
US 2014/0280659 A1 Sep. 18, 2014

(51) Int. Cl.
*G06F 15/16* (2006.01)
*H04L 12/58* (2006.01)
*H04L 12/18* (2006.01)

(52) U.S. Cl.
CPC ............ *H04L 51/24* (2013.01); *H04L 12/1895* (2013.01)

(58) Field of Classification Search
USPC ............ 709/203, 206, 207; 455/435.1, 556.1, 455/567
See application file for complete search history.

(56) References Cited

U.S. PATENT DOCUMENTS

| | | | |
|---|---|---|---|
| 6,499,021 B1 * | 12/2002 | Abu-Hakima | 706/10 |
| 6,654,689 B1 * | 11/2003 | Kelly et al. | 702/3 |
| 6,691,151 B1 * | 2/2004 | Cheyer et al. | 709/202 |
| 6,820,237 B1 * | 11/2004 | Abu-Hakima et al. | 715/210 |
| 6,823,331 B1 * | 11/2004 | Abu-Hakima | 707/758 |
| 7,034,691 B1 * | 4/2006 | Rapaport et al. | 340/573.1 |
| 7,036,128 B1 * | 4/2006 | Julia et al. | 719/317 |
| 7,062,723 B2 * | 6/2006 | Smith et al. | 715/860 |
| 7,069,259 B2 * | 6/2006 | Horvitz et al. | 706/25 |
| 7,069,560 B1 * | 6/2006 | Cheyer et al. | 719/317 |
| 7,130,887 B2 * | 10/2006 | Goldberg | 709/206 |
| 7,136,661 B2 * | 11/2006 | Graske et al. | 455/466 |
| 7,165,093 B2 * | 1/2007 | Smith et al. | 709/206 |
| 7,181,017 B1 * | 2/2007 | Nagel et al. | 380/282 |
| 7,301,914 B2 * | 11/2007 | Segal et al. | 370/311 |
| 7,409,428 B1 * | 8/2008 | Brabec et al. | 709/206 |
| 7,587,033 B2 * | 9/2009 | Crago et al. | 379/88.14 |
| 7,864,930 B2 * | 1/2011 | Clark et al. | 379/88.18 |
| 8,291,011 B2 * | 10/2012 | Abu-Hakima et al. | 709/203 |
| 2002/0118118 A1 * | 8/2002 | Myllymaki et al. | 340/686.1 |
| 2003/0143974 A1 * | 7/2003 | Navarro | 455/404 |
| 2004/0150518 A1 * | 8/2004 | Phillips et al. | 340/500 |
| 2004/0193617 A1 * | 9/2004 | Adler | 707/100 |
| 2006/0041505 A1 * | 2/2006 | Enyart | 705/40 |

(Continued)

*Primary Examiner* — Sargon Nano
(74) *Attorney, Agent, or Firm* — The Villhard Patent Group

(57) ABSTRACT

Systems, methods, and apparatus for sending electronic messages. One embodiment provides methods which include accepting a message in a disparate source-message-type. The recipient, a recipient-message-type, and the source-message-type are determined and, responsive thereto, adaptors are selected for changing the message from the source-message-type to the recipient-message-type. The message is adapted and versions of the adapted message are sent to the recipients. The message types correspond to permutations of technologies and user preferences associated with the messages. Moreover, the message could be an emergency notification, part of a campaign, etc. Quality of service (QOS) measurements regarding the message can be gathered and different adaptors can be dynamically selected responsive thereto. Further, third-party adaptors can be accepted and rules can be implemented pursuant to which the third-party adaptors will be used. In some cases the message can further comprise data in differing formats on which the adaptors are used.

1 Claim, 7 Drawing Sheets

(56) References Cited

U.S. PATENT DOCUMENTS

| | | |
|---|---|---|
| 2006/0206568 A1* | 9/2006 | Verma et al. .................. 709/206 |
| 2007/0047692 A1* | 3/2007 | Dickinson et al. .............. 379/41 |
| 2009/0049405 A1* | 2/2009 | Lockhart et al. .............. 715/810 |
| 2009/0115621 A1* | 5/2009 | Nguyen et al. ............. 340/686.1 |
| 2009/0286505 A1* | 11/2009 | Kirk ........................... 455/404.2 |
| 2012/0159335 A1* | 6/2012 | Lockhart et al. ............... 715/733 |
| 2012/0327837 A1* | 12/2012 | Harrington et al. ........... 370/312 |

* cited by examiner

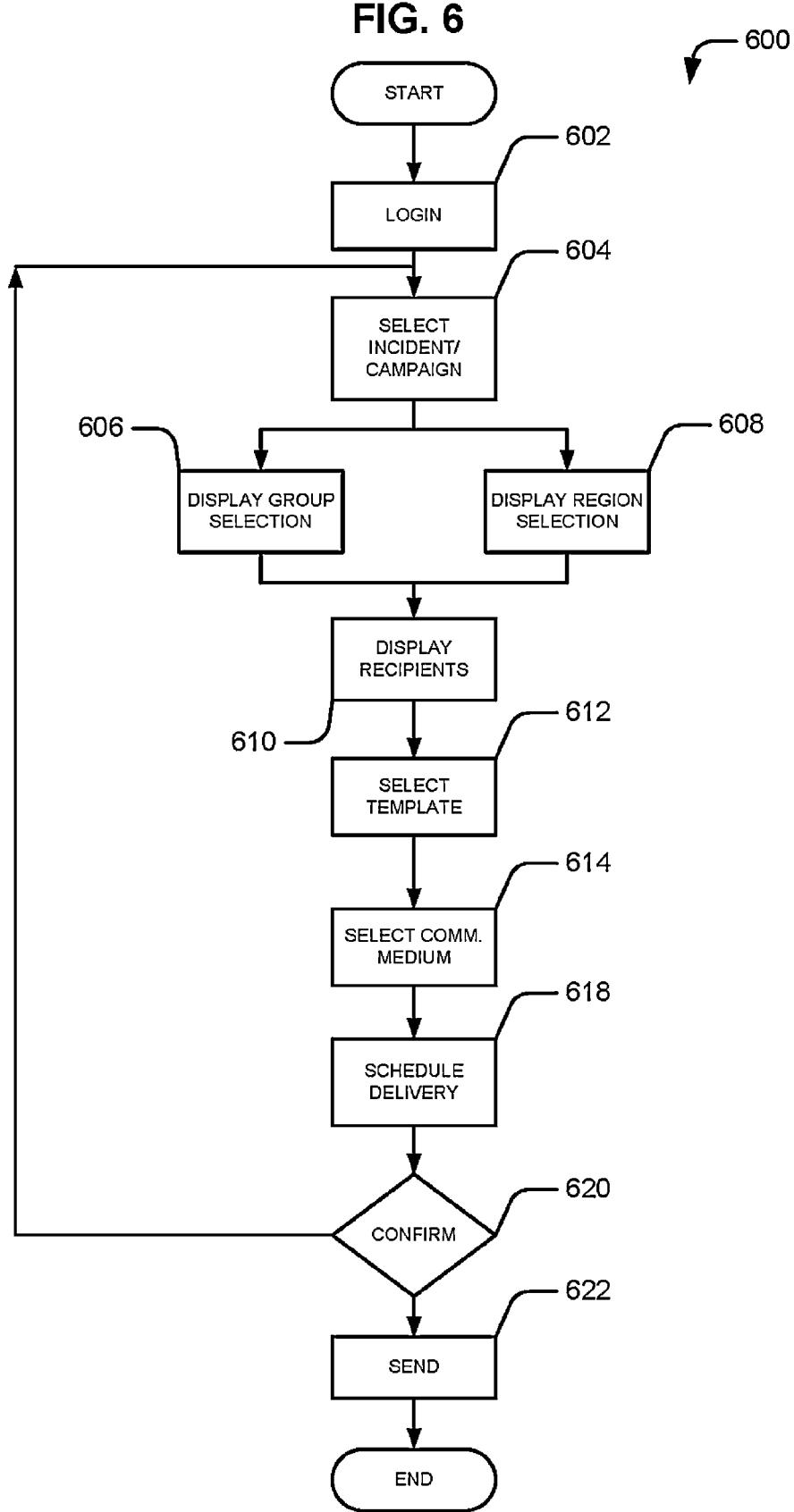

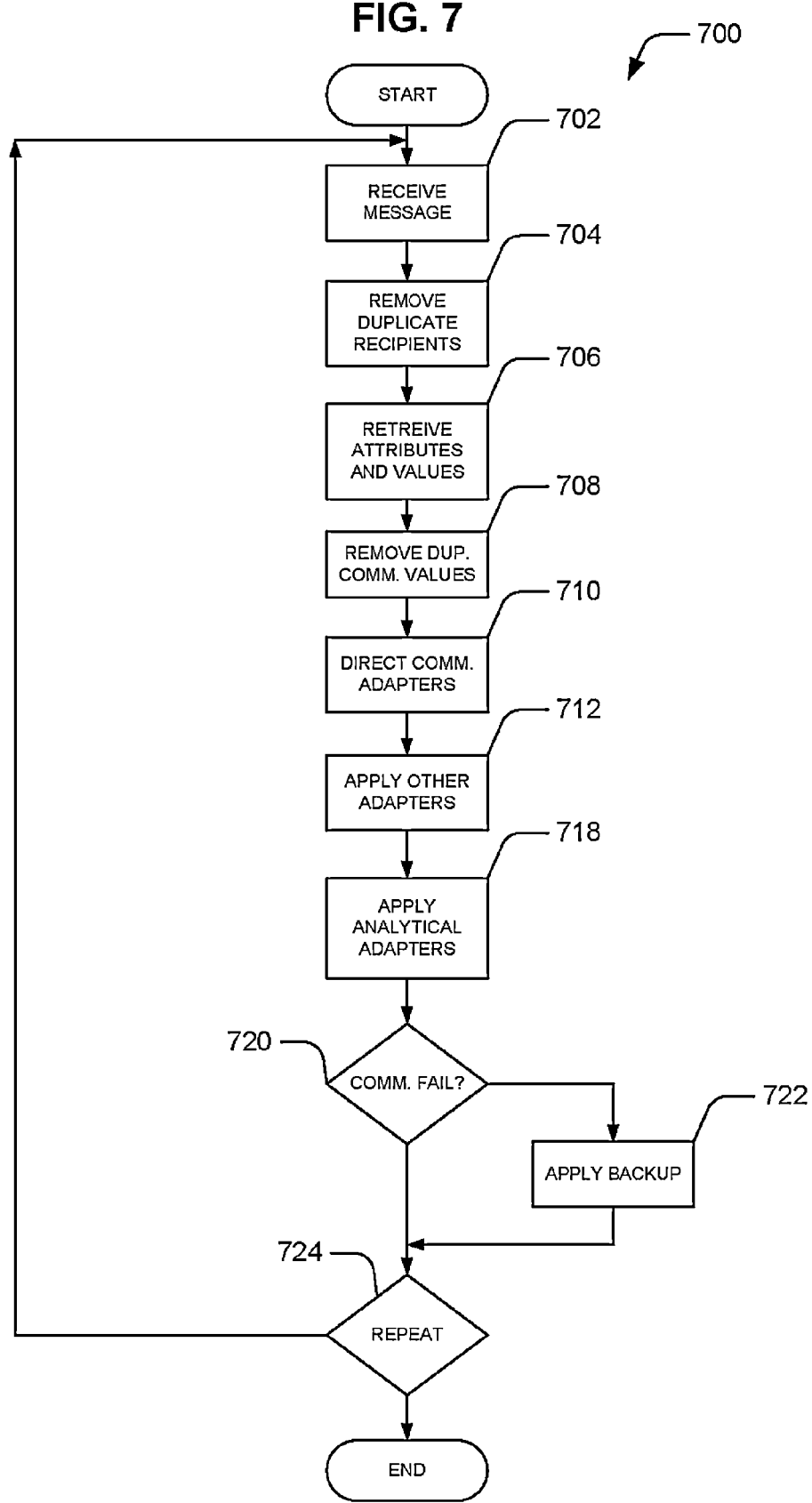

ADAPTOR BASED COMMUNICATIONS SYSTEMS, APPARATUS, AND METHODS

BACKGROUND

Hurricane Sandy (New Jersey, 2012) demonstrated that, even in today's high-technology environment, communication systems remain fragile, prone to damage, and capable of being overwhelmed by events. More particularly, during that storm, telephone, cable television, Internet, and other communication networks suffered severe damage. This damage caused a situation in which hundreds of thousands of people, if not millions, could not communicate with one another or with people outside of the storm-affected area. On a similar note, commercial organizations could not reach their employees, customers, and suppliers. Indeed, at one point, it was reported that brokerage firms at the New York Stock Exchange were experiencing difficulty executing trades because key personnel could not be contacted. Worse still, government officials, first-responders, and other critical personnel could not send warnings, updates, instructions, etc. to the storm victims.

While Hurricane Sandy posed a dramatic challenge to the affected communication systems, it does not require an epic storm to cause communication problems. Indeed, real-time communications and failures thereof can be critical to the success of any organization and, more particularly, those whose owners wish to build smarter enterprises. With personnel, processes, communication devices, etc. in many of these enterprises spread around the world, the communication challenges can be immense. Communication failures can disrupt these organizations leading to undelivered products/services, dissatisfied customers, confusion in the market place, etc.

Most people in organizations (commercial or otherwise) who wish to communicate merely want to express their thoughts relative to whatever mission, job, goal, etc. that they might be attempting to fulfill. Yet, to do so, they must consider a number of factors that are more or less irrelevant to those actual thoughts. For instance, the communication device they use to express themselves might be relatively powerful with a full set of user interface features. In contrast, the device with which the recipients might prefer to receive their messages could be comparatively limited. In one such scenario the person generating a message might be using a desktop computer with a full keyboard and an email program with a complete graphical user interface while their intended recipients might be using rudimentary cellular phones with limited capabilities for receiving messages. In this case, the cellular phones might be effectively limited to receiving SMS (Short Message Service) messages. Thus, to communicate successfully, the sender might need to format their messages in such a way that they will display properly on the more limited devices. Of course, the sending party might not even be aware of the recipients' limitations thereby creating an even higher possibility of communication failure.

Moreover, even non-technical issues pose communication challenges. For instance, one or more of the parties involved in an attempted communication might understand a language different than that understood by the sender. In such cases, the sender might need to have a translation performed before sending the message. Additionally, user preferences can also play a role in limiting the ability of people to communicate. Of course, some people prefer to receive fully formatted emails. Others prefer Twitter messages while others prefer to receive POTS (Plain Old Telephone System) system calls. Thus, while a particular sender might be able to communicate effectively with some of their intended recipients, it is increasingly likely (with the continuing proliferation of communication technologies) that their communications with at least some intended recipients will suffer.

Additionally, communicating in real-time can be one of the keys for building a smarter enterprise. Many enterprises have to deal with people, processes, and communication devices that span numerous countries, time zones, cultural divides, languages, legal systems, as well as various enterprise and/or user related rules and preferences. To make matters more complex (and the likelihood of communication difficulties all the more likely), various communication-related trends and disruptive technologies continue to wash across the world. For instance, a few years ago Twitter had not yet been invented. Now in some settings it is vital for successful, real-time communications. Yet, having differing communication strategies to accommodate all of these factors can be prohibitively expensive.

SUMMARY

The following presents a simplified summary in order to provide a basic understanding of some aspects of the disclosed subject matter. This summary is not an extensive overview of the disclosed subject matter, and is not intended to identify key/critical elements or to delineate the scope of such subject matter. A purpose of the summary is to present some concepts in a simplified form as a prelude to the more detailed disclosure that is presented herein.

The current disclosure provides systems, apparatus, methods, etc. for communicating among various users, communication devices, etc. and more particularly for exchanging messages between various disparate users, disparate devices, etc. using a number of disparate communication technologies via dynamically selected message adaptors. Embodiments take care of the delivery of messages in an efficient and effective manner across continents, languages, delivery mechanisms, communication devices, and time zones. Embodiments provide integrated auditing and tracking capabilities such as those related to FINRA (Financial Industry Regulatory Authority) compliance while providing intelligence, flexibility, and insight into such communications. Moreover, embodiments free users from accommodating the communications hurdles discussed herein. Instead, embodiments allow users to concentrate on the content of their message and/or on their target audiences.

As alluded to above, 2012 posed a number of challenges to the United States. These challenges included emergencies, tragedies, and the ongoing financial crisis. From the destruction and havoc wrought by Hurricane Sandy, an out break of meningitis, the Dark Moon Rising massacre, the Sandy Hook Elementary School shooting, to ongoing budgetary negotiations (or lack thereof) between Congress and the President, various organizations found themselves responding to rapidly changing threats, events, situations, etc. Such events, no matter how tragic, seem likely to recur at unpredictable times and places. Thus, a need will continue to exist for mass communication and/or emergency notification systems to help minimize risk and damage, to help maximize safety, and to keep organizations running despite the aforementioned potential sources (and others) of communication failures.

For instance, as reported by the New York Times, "If there is one lesson transit officials have learned from Hurricane Sandy, it is that in the Internet era, keeping riders up to date is just as important as tracks and rolling stock. Blow it, and they will let you know. As workers raced to bring washed-out tracks, flooded tunnels and swamped electrical equipment back online, they also faced the daunting task of keeping millions of riders informed of conditions and schedules that sometimes shifted by the minute, using tools that included Facebook, Twitter, Flickr and YouTube." Rivera, Ray, "Social Media Strategy Was Crucial as Transit Agencies Coped With Hurricane." The New York Times, 14 Dec. 2012.

Embodiments provide communication and/or notification systems, apparatus, methods, etc. that are flexible, expandable, and extensible. These embodiments also help users manage risk and minimize damages while responding to emergencies and managing potentially complex and/or fluid situations. For instance, embodiments allow government, commercial, and other organizations to quickly and effectively notify their constituents during emergencies and other urgent situations. Embodiments also allow organizations to automatically communicate with employees, partners, and other stakeholders as well as improving organizational continuity.

Some embodiments provide systems and methods for sending electronic messages. One embodiment provides a method which includes accepting a message in a source-message-type. The recipient, the source-message-type, and a recipient-message-type are determined dynamically and, responsive thereto, adaptors are dynamically selected for adapting the message from the source-message-type to the recipient-message-type (which can be disparate from one and other). In such methods, the message adaptation is also made and the adapted message is sent to the recipient. The message types of the current embodiment correspond to permutations of user (sender, recipient, and/or otherwise) preferences (including their preferred human languages) and communications technologies at various levels of the OSI model (or other models) of communication systems. Note that many preferences, as they relate to the current embodiment, happen to deal with the higher levels of such models where at users typically have, express, and/or select their preferences. Quality of service (QOS) measurements regarding the message can be gathered and different adaptors can be selected responsive thereto. Moreover, where communications rely on third-party networks/services, service-related terms and/or routing schemes can be negotiated in real-time or near real time. Further, third-party adaptors can be accepted and rules can be implemented pursuant to which the third-party adaptors will be used. In some cases the message can include unstructured data on which the adaptors operate. Another embodiment provides a system with a network interface, a processor, and a memory in communication with one another. The memory stores processor executable instructions which when executed by the processer cause the processor to perform methods such as those disclosed herein.

To the accomplishment of the foregoing and related ends, certain illustrative aspects are described herein in connection with the annexed figures. These aspects are indicative of various non-limiting ways in which the disclosed subject matter may be practiced, all of which are intended to be within the scope of the disclosed subject matter. Other advantages and novel and/or obvious features will become apparent from the following detailed disclosure when considered in conjunction with the figures and are also within the scope of the disclosure.

BRIEF DESCRIPTION OF THE FIGURES

The detailed description is described with reference to the accompanying figures. In the figures, the left-most digit(s) of a reference number usually identifies the figure in which the reference number first appears. The use of the same reference numbers in different figures usually indicates similar or identical items.

FIG. 6 illustrates a flowchart of yet another method for communicating using various disparate communication technologies.

FIG. 7 illustrates a flowchart of still another method for communicating using various disparate communication technologies.

DETAILED DESCRIPTION

Figure 1:
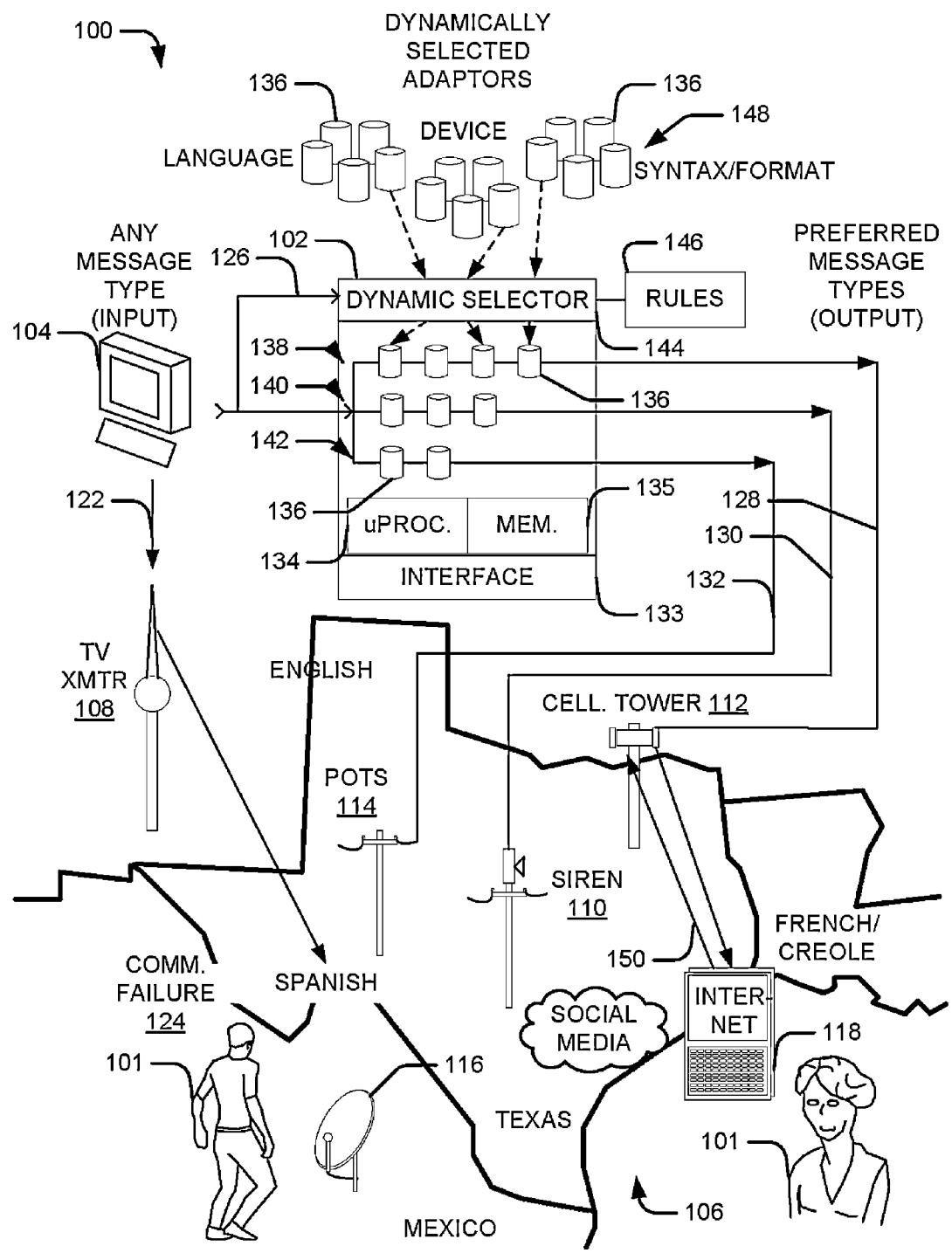
FIG. 1 illustrates a system for communicating using various disparate communication technologies.

This document discloses systems, apparatus, methods, etc. for communicating among various users, devices, etc. and more particularly for exchanging messages between various disparate users, disparate devices, etc. using a number of disparate communication technologies via dynamically selected message adaptors.

Generally, with heretofore available systems, a sender sends a message or notification of some sort directly to a recipient. Since many senders and/or recipients (herein "users") are human, ideally, most messages are sent in a message type and a human language that both of their communication devices and the users can handle and understand. Clearly, that does not always occur. Moreover, as the number of recipients increases for any given message, the chances increase that at least one recipient will not be able to understand the message due to differences between the language and message type in which the message was sent and the language and message type which that recipient is prepared to handle. Further, as the number of different communication processes, networks, devices, etc. increase so does the chance that the message will be partly or wholly incompatible with some device, protocol, user, etc. involved. Thus, when a person (or machine, process, etc.) attempts to send a mass notification, it is almost a certainty that some compatibility issues will result.

With heretofore available systems, message senders seeking to communicate to disparate recipients with disparate communications devices over disparate communication systems had to send out mass notification messages in a repetitive, silo-like fashion. In other words, users would cut and paste the same content into numerous messages each being hand-tailored for the myriad of technological, human-level, (and other) permutations involved. They would then send these messages out as quickly as human involvement would allow.

Such approaches suffer a number of challenges. First, managing the multiple distribution outlets or channels requires a large investment in time and resources. Moreover, gaps in coverage could still result even after spending the time to log into, or otherwise access, each outlet. Inconsistency and errors, of course, also tend to creep into such numerous hand-tailored messages.

Secondly, if creating these messages involves accessing secure, privileged, proprietary, or confidential information, the talent pool from which to draw personnel will likely be circumscribed by the need to limit access to that sensitive information. Accordingly, it might prove difficult to find someone (or a team) possessing the skills needed to access each one of the various outlets involved and to perform each of the necessary hand-tailoring steps. Moreover, these individuals might not have the proper passwords, accounts, etc. for each of the outlets. Maintaining these accounts might also be time-consuming particularly if personnel turnover occurs in the responsible organization with systems heretofore available.

Thirdly, with such approaches, accountability can become problematic. When several or more individuals are involved, proving who sent a particular message, when, and in which message type might be difficult. Knowing who received the message (and when and where they did so) can also pose similar problems. In addition, should the sending of a version of a message have been omitted previously available systems might yield little, or no, visibility into that oversight.

Next, while social networks provide a convenient forum through which a message might go viral (thereby speeding its dissemination), social networks also have particular issues associated with them. More specifically, once a message enters a social network, users can modify, spoof, hack it, or take some other malicious action with respect to it. The sender of a particular message therefore might not be able to adequately protect their brand, the message, its privacy, etc. using previously available systems.

Additionally, obtaining meaningful metrics using previous approaches can also be challenging. One metric that poses a challenge to gather is determining and quantifying which of the intended recipients has received (their version of) a particular message. While some information along these lines might be available, it tends to be ad hoc and disorganized. Obtaining actionable information from it could therefore become a resource intensive project. Without this metric and other analytics, meaningful decision making might be difficult to make and/or error prone. Embodiments can help users solve or otherwise deal with some or all of these issues among others.

More specifically, embodiments allow government, commercial, and other organizations to quickly and effectively notify their potentially numerous constituents during emergency and other situations. Embodiments also allow these organizations to automatically communicate with employees, partners, and other stakeholders as well as improving organizational continuity. Embodiments do so in a variety of contexts too while adding intelligence, flexibility, and insight into communications made accordingly.

Embodiments also enable organizations to comply with various communications-related regulations. More specifically, certain regulations require particular organizations to communicate statistics about certain topics to affected individuals so that they can glean insights into those organizations. The U.S. Clery Act is an instance of such regulations and requires colleges and universities to disclose information regarding on-campus crime. Embodiments enable school officials to comply with the Clery Act by distributing (over systems provided by embodiments) annual security reports to students and employees and by providing publically accessible crime logs. Timely warnings of specific incidents (and trends) can also be distributed via systems, apparatus, and methods of the current embodiment. Thus, in the event that an incident occurs, these schools and their students and employees will likely be better equipped to deal with the situation. Embodiments therefore increase campus safety and safety in other areas.

In other scenarios, embodiments can help government officials respond to natural disasters such as hurricanes. More specifically, incident management teams can help ready themselves for deployment by using systems, apparatus, and methods of the current embodiment to notify team members that they might be needed. The types of team members that might be notified include emergency medical responders, fire department personnel, law enforcement officers, etc. To complicate matters, these team members might be distributed across one or more states and might also be traveling thereabout. Even so, when these team members deploy to emergency areas in their own states or elsewhere, these large undertakings can be managed in part or in whole via systems of embodiments. This result can occur even though team members might be mostly volunteers that are deployed on timelines that impose surprises and inconveniences on them. Notifications can be sent to them thereby enabling the volunteers to coordinate their deployment with their families, employers, etc. Doing so and providing feedback to their deployment leaders of course takes time and effort. Both of which can be reduced in accordance with the current disclosure.

Such notifications and the resulting responses can be handled via most ad hoc (or arbitrarily) assembled combinations of land-line phones, cellular phones, text messaging services, email, social networks (such as Facebook), Twitter, etc. in accordance with embodiments. Furthermore, the notifications and responses can be coordinated in real-time even though they might be numerous and might be coming from (and going to) disparate communication devices. As a result, deployment leaders can report their deployment readiness back to the commanding authorities without undue delay. Embodiments can allow for such results even in the face of blackouts, debris in the streets, etc. and the resulting inability of repair crews to clear the way and/or restore infrastructure. Thus, response, rescue, and recovery efforts can begin sooner and can achieve better results (as measured by rescued victims, saved property, etc.) using systems of the current embodiment.

Systems and methods of embodiments can also be used to aid in preparing for and coping with events other than emergencies. For instance, Formula I racing and other entertainment events can draw hundreds of thousands of visitors. Systems of the current embodiment can allow local governments to reach out to the numerous visitors and residents of the area during such events. Even county governments and county associations (which can be fragmented because of their inter-agency nature) can coordinate activities. Consider a typical county fire department association which is usually composed of a dozen or so members from differing fire departments, cities, etc. Even such fragmented organizations can communicate and work together using systems of the current embodiment to integrate their disparate communication systems. Thus, where an event crosses jurisdictional lines, ad hoc response teams can respond effectively in an integrated, inter-operable manner.

For instance, the approximately 63 wild fires in Texas that started over the 2011 Labor Day weekend represent a group of related incidents that embodiments can help users deal with. During those wild fires, numerous municipal fire departments, police departments, and disaster management offices had to coordinate their own activities along with those of the National Forest Service (NFS), the Federal Emergency Management Agency (FEMA), the National Weather Service (NWS), various county offices, and even charities such as the Red Cross. Embodiments would enable communications across these disparate jurisdictions (and attendant communication systems) without the end users necessarily having to change their preferred communication devices, technologies, human-level preferences, etc. Indeed, embodiments allow for integration and inter-operability with IPAWS (Integrated Public Alert and Warning Systems), CMAS (Commercial Mobile Alert Systems), and like systems. Thus, systems and methods of the current embodiment can assist in notifications related to natural disasters (hurricanes, tornadoes, snowstorms, etc.) hazardous material events (chemical spills, disease outbreaks, etc.), law and order events (Amber Alerts, terrorist threats, etc.), and in other situations.

The current disclosure provides embodiments in which dynamically selected adaptors, working in conjunction with certain rules, are ordered and applied to an incoming message to transform it into one or more message instances suitable for delivery to the various recipients and in message types which the recipients can handle. The adaptors also respond to attributes associated with the senders and recipients in adapting the incoming message to the recipient-message-types. These user attributes include users' communication preferences, their current and/or default location, and their availability among other considerations. Thus, embodiments help enable flexible and intelligent communication of messages and/or notifications and the resulting responses between the parties involved in the communication.

The adaptors of embodiments include communication adaptors, transformation adaptors, process adaptors, collaboration adaptors, and analytical adaptors. Communication adaptors of the current embodiment adapt a message originating in a message type associated with one communication technology to a message type suitable for forwarding via another communication technology. Thus, one communication adaptor might transform an email message for transmission to users in Latin America via SMS. Another communication adaptor could adapt an email declaring a tornado warning so that it becomes an analog signal capable of triggering a legacy tornado siren.

Transformation adaptors can perform a variety of functions such as translating a message (or its contents) from one human language to another, filtering profanity, etc. Process adaptors manipulate the delivery of the message in some manner such as scheduling its delivery. Meanwhile, as their name implies, analytical adaptors perform analysis related to the messages upon which they operate. For instance, an analytical adaptor could detect trends associated with the message such as the rate at which responses are being received.

Systems of the current embodiment also provide an interface through which third parties can create adaptors and the rules governing their selection and application to various messages. Thus, should a third party develop some new communication technology, that party could develop one or more adaptors (and associated rules) and register the same with the system. In that way, should a message arrive via that new communication technology, the system can dynamically select the appropriate third party adaptor, execute it, and deliver the adapted message accordingly. Additionally, messages destined for delivery via that third-party technology can be adapted accordingly on the fly without user intervention.

Furthermore, systems of the current embodiment can also associate metrics with each of the adaptors. These metrics can include measurements related to communication-related costs, reliability, capacity, current network status, access control, location compatibility, etc. Moreover, from these metrics, the system can derive QOS measurements and dynamically select adaptors responsive to those measurements. In the alternative, or in addition, the system of the current embodiment can negotiate with third-party networks/services responsive to changes in QOS metrics related to these systems/services. In some embodiments, the system can assign a rating to various messages related to the authenticity of the message and/or value of the content to the sender (and/or some or all of the recipients). Moreover, the system can use these ratings to prioritize messages.

In the alternative, or in addition, the system could substitute adaptors based on business reasons. For instance, suppose a company wishes to expand an advertising campaign from Latin America to a broader audience. In this case, systems of the current embodiment could initiate a substitution of a communication adaptor for delivering SMS messages to recipients in Latin America to a communication adaptor for delivering SMS messages to a worldwide community. In another scenario, some particular third-party network/service might spontaneously alter their prices and/or QOS related terms which of course would affect the costs and/or QOS related to messages handled by systems of embodiments. The system of the current embodiment could respond by (re)negotiating these terms and or dynamically substituting various adaptors so that the messages could be re-routed in light of these third-party changes.

Some embodiments provide systems which process "unstructured" data in certain scenarios. For instance, should a notification message be sent regarding some event or condition, various responses might include a variety of unstructured content. In one scenario a tornado warning might be sent out and recipients might respond spontaneously with video or still images of the storm. Their responses could also indicate the status of the tornado (on the ground or not, its size, strength, etc.). Likewise, their responses might include communications via various social networks. In the alternative, or in addition, their "responses" might involve their unilateral decision to respond via a communication channel unrelated to the original message regarding the event. Adaptors could be implemented in these systems to recognize, capture, process, etc. some or all of these types of unstructured data thereby providing a more comprehensive understanding of the storm (or event) than might be possible otherwise and (often) in less time. Adaptors can also be created that combine such unstructured information with structured information to provide insights into the corresponding situations, events, conditions, etc. In one scenario, the information derivable from communications within a social network could be analyzed with respect to a particular FEMA or other government notification to determine how rescue, recovery, and restoration operations are proceeding.

Turning now to the drawings, FIG. 1 illustrates a system for communicating using various disparate communication technologies. Among other components of the system 100, FIG. 1 illustrates users 101, adaptation subsystem 102, source 104, region 106, broadcast television network 108, siren/loud speaker 110, cellular telephone network 112, POTS (Plain Old Telephone System) network 114, satellite-based communication network 116, cellular phone 118, message 122, communication failure 124, notification or incoming message 126, adapted messages 128, 130, and 132, interface 133, processor 134, memory 135, adaptors 136, adaptor sets 138, 140, and 142, dynamic adaptor selector 144, rules module 146, adaptor library 148, and response 150.

Briefly, in the current embodiment, the system 100 operates as follows. A user acting as or with a source 104 creates an incoming message 126 and sends it to the adaptation subsystem 102. The dynamic adaptor selector 144 inspects the incoming message 126 and determines from it (or other information available to the dynamic adaptor selector 144) the type of message that it happens to be, its intended recipients, and perhaps its source. From that information (as is disclosed elsewhere herein), the dynamic adaptor selector 144 selects one or more adaptors 136 and places them in an order which it determines to form one or more adaptor sets 138, 140, and 142. Moreover, the dynamic adaptor selector 144 creates each adaptor set 138 to correspond to one or more intended recipients that happen to share all characteristics that determine the make up of that adaptor set 138 (including its ordering). The adaptation subsystem 102 then processes the incoming message with each adaptor set 138, 140, and 142 to create the corresponding adapted messages 128, 130, and 132. The adaptation subsystem 102 therefore sends these adapted messages 128, 130, and 132 to their corresponding recipients in accordance with the message type associated with these recipients.

Furthermore, one or more of the recipients might choose to send a response 150 to the source 104 in some scenarios. Of course, some recipients might not be able to, or might choose not to, send a response to the source 104. Indeed, some recipients might not receive the message 126 (or their corresponding version of it) or might not be able to read, interpret, etc. the same. In some cases, therefore, some responses 150 might be sent and some might not. The responses 150 that are sent traverse the system 100 in a manner generally similar to how the incoming message 126 traversed the system 100. The adaptation subsystem 102 of the current embodiment treats these responses 150 as incoming response messages and processes them with the dynamically selected adaptors 136. Of course, provisions can be made in various adaptors 136 such that responses 150 are recognized as such and are associated with the original incoming messages 126. Metrics can then be gathered regarding the response 150, the response rate, etc.

Moreover, the adaptation subsystem 102 can instrument various points throughout the system 100 to measure how the overall system 100 performs as well as how itself performs. These measurements can occur on any given message, any portion of the system 100, etc. Thus, the adaptation subsystem 102 of the current embodiment measures the quality of service (QOS) provided by the system 100 and, if desired, dynamically changes the selections of the adaptors 136, message pathways, etc. to adjust for changes in the QOS of the system 100 as well as in changes in the incoming message(s) 126 and/or user preferences. Furthermore, system 100 can instrument various third-party networks/services to determine and/or respond to their QOS.

With continuing reference to FIG. 1, at this juncture, it might be desirable to consider aspects of some of the components of system 100 in more detail. First, the system 100 can spread over or serve a region 106. That region 106 can be any size but for the purposes of illustration, FIG. 1 illustrates the region around the state of Texas. Perhaps interestingly, that region 106 contains areas where English is the predominant language and areas where Spanish (Mexico for instance) and French or French-Creole (such as Louisiana) are spoken widely enough to be of note. Note also that region 106 spans numerous jurisdictional lines including several state lines, many county and municipal limits, and national boundaries (between the U.S. and Mexico) and even geographic boundaries (here, the coastline of the Gulf of Mexico).

Additionally, users 101 in the region employ a number of communication technologies as represented by a few illustrative technologies shown by FIG. 1. For instance, a television network 108 (illustrated as a television transmission tower) represents one form of wireless broadcast technology even though many others (such as AM, FM, and short wave radio) exist. FIG. 1 also illustrates that the region 106 can include siren/loud speakers 110. These (and other technologies) can be in communication with IPAWS/CMAS and like systems. In this case, the siren/loud speaker 110 can serve as a last-minute/last-mile device to alert those nearby users 101 to certain notifications (such as, tornado and other violent weather warnings).

POTS network 114 represents that even somewhat older technologies can be employed in system 100. Of course, even older legacy (for instance telegraph systems) can be employed in communication system 100. Of course, cellular telephone network 112 illustrates that newer or emerging technologies can be used in system 100. And, of course, Internet-based technologies such as social networks, Twitter, email systems, SMS systems, etc. can be integrated into system 100 by adaptation subsystem 102. "Social media" can also be employed in system 100 since, if for no other reason, various social media tend to be Internet-based forms of communications and/or messages conveyed by various social media tend to piggyback on other communication technologies. Source 104 (illustrated as a desktop computer) also indicates that such technologies can be used in communication system 100.

In the absence of adaptation subsystem 102, though, communications can be prone to failure. For instance, one or more of the physical lines (wires, fiber optic cables, etc.) linking the various corresponding devices can be damaged or inoperative either in whole or in part. But, other non-technical and/or human-level issues can cause communication failures 124 in the system 100. Such as a particular incoming message 126 might be sent or transmitted in a message type not suitable for one or more of the intended recipients. For instance, it might be sent in a language that the particular user cannot understand. In the alternative, or in addition, if one of the recipients happens to be handicapped (such as being blind or deaf) that recipient might be effectively unable to receive the message despite perhaps flawless technical performance by previously available systems. That message could also, or in the alternative, be delivered at a time or in a way such that it is effectively unavailable to one or more of the intended recipients. For instance, someone might "call" using POTS network 114 when no one happens to be home and any recorder there is unpowered.

Even non-technical issues might cause a communication failure 124 in communication system 100 in the absence of adaptation subsystem 102. In some scenarios, the source 104 might generate messages 122 in one language (possibly English) and some of the intended recipients might only understand a second language (possibly Spanish or French-Creole). Thus, despite flawless technical performance, system 100 might effectively fail in such situations were it not for adaptation subsystem 102.

With continuing reference to FIG. 1, aspects of adaptation subsystem 102 are disclosed herein. For instance, the source 104 might include any sort of person, process, device, communication technology, etc. that can generate the incoming messages 126. Of course, some convenient sources 104 would be desktop computers, laptop computers, notebook computers, tablets, smart phones, etc. But other communication technologies and devices are likely to arise and can be used with communication subsystem 102 as is further disclosed elsewhere herein. Moreover, pre-existing, pre-digital, legacy or "old" technologies such as television networks 108, siren/loud speakers 110, cellular telephone systems 112, POTS systems 114, satellite-based communication systems 116, cellular phones 118, etc. can generate input "messages" 126 as well. For instance a POTS voice message could be directed to the adaptation subsystem 102 as an incoming message 126. Adaptation subsystems 102 of the current embodiment are configured (in terms of hardware, software, firmware, etc. and combinations thereof) to accept incoming messages 126 of these various message types. Though, in some embodiments, adaptation subsystem 102 is configured to adapt messages between various pre-dominantly human-level message types.

Accordingly, the user 101 of the source 104 might have a preferred or pre-configured type of incoming message 126 which they ordinarily send. Of course, that message type might change or be changed from time-to-time. Yet, the sending user 101 need not concern themselves with the potential consequences of such changes. The adaptation subsystem 102 detects these changes (or can be informed of the same) and adapts the incoming messages 126 accordingly.

Moreover, incoming messages 126 can convey a wide variety of data, information, content, etc. Some incoming messages 126 will be SMS messages which carry only textual information. Other incoming messages 126 will be email messages formatted fully in accordance with the application(s) which generated them conveying at least textual information. That information, though, might be formatted in many different ways and might be accompanied by other content. For instance, some incoming messages 126 might have attachments or convey multimedia content such as audio, visual, audio/visual, etc. files.

As is further disclosed herein, incoming messages 126 can also convey "unstructured data." Unstructured data, in the current embodiment, being content that does not match the format of the content of the incoming message 126 and/or does not match the content expected in an anticipated response 150. In some scenarios, some users might responds to an SMS message by sending jpg files. In other scenarios, unstructured data arises because the original message might have conveyed a response form which some users ignored and instead responded with an SMS message.

In the alternative, or in addition, some incoming messages 126 are "notifications" that can serve to alert the adaptation subsystem 102 to generate a message. Of course, such notifications can be automatically generated by the source 104 via some sensor sensing an incident, via a campaign triggering various messages (whether social media messages or not). Upon receiving such a notification, the communication subsystem 102 can generate the actual message to be "input" into the adaptation subsystem 102. For illustrative purposes, though, FIG. 1 shows only an incoming message 126. Also, it might be worth noting that, the ultimate "source" of the incoming message 126 might be a human user 101 rather than a machine or a computer. Although, either type of source 104 and others are within the scope of the current disclosure.

All of these considerations, and others too numerous for recitation here, result in each message (whether an incoming message 126, a response 150, or otherwise) being of a given message type. As those skilled in the art understand, communication systems and the messages therein can be characterized by the various technologies used in their implementation. For instance, the Open Systems Interconnect (OSI) model characterizes communication systems in terms of seven "layers:" the application, presentation, session, transport, network, data link, and physical layers. Of course, other models exist such as the TCP/IP (Transport Control Protocol/Internet protocol) model which also characterizes communication systems in terms of certain layers, namely the application, transport, Internet, and physical layers. Of course, other models can be used to characterize communication systems and the messages therein without departing from the scope of the current disclosure. While some systems 100 of some embodiments can be configured to perform adaptations at any/all such levels, systems 100 of other embodiments can be configured to perform adaptations at levels that tend to involve more human-level preferences.

Furthermore, numerous protocols, specifications, standards, and the like (hereinafter "communication technologies") define differing ways in which a message can originate, propagate, and be received via a communication system based on some particular permutation of these communication technologies. Thus, in an open communication system 100 such as the one illustrated by FIG. 1, each message has associated therewith a permutation of these various technologies along with user preferences (such as the human language in which it is created). Herein each such permutation is termed a "message-type." Clearly, a user attempting to manually alter an incoming message 126 to create the various versions thereof for more than even a few message types would likely find themselves overwhelmed. Adaptation subsystem 102 of the current embodiment relieves the user 101 of such burdens and dynamically creates the numerous versions of the incoming message 126 having the message types deemed reasonable likely to be received and understood by the various recipients despite the various technologies and user preferences involved in the communication.

As illustrated in FIG. 1, adaptation subsystem 102 can be a server or other type of apparatus capable of executing programs or collections of processor executable instructions for carrying out various methods disclosed herein. Moreover, adaptation subsystem 102 includes the processor 134 and the memory 135 in communication therewith and storing such instructions. FIG. 1 also schematically illustrates that the interface 133 communicates with the processor 134 and with the sources 104 and various receiving devices. Thus, the adaptation subsystem 102 executes the dynamic adaptor selector 144 as well as the adaptors 136 themselves in systems 100 of the current embodiment.

Regarding the adaptors 136, the system 100 includes the library 148 of adaptors 136. FIG. 1 illustrates that the library 148 resides externally from the adaptation subsystem 102 although it could reside internally within the same. In any event, it contains a number of adaptors 136 of various kinds. For instance, some adaptors translate message content from one human language to another. Other adaptors 136 adapt messages so that they can be received, displayed, or otherwise accessed by differing communications devices such as, but not limited to, those illustrated by FIG. 1. Other adaptors 136 might re-format an incoming message 126 (or some version thereof) to suit a different protocol than its original protocol. Thus, a particular adaptor might accept a fully formatted email incoming message 126 and strip it of information, content, formatting, metadata, etc. until it becomes suitable for forwarding as an SMS or Twitter message. Moreover, the library 148 can contain and accept adaptors 136 created by third parties. Thus, in some cases, entities other than those who might own or control adaptation subsystem 102 can create and load adaptors 136 into the library 148 for adaptation to/from communication technologies which they create.

With continuing reference to FIG. 1, the dynamic adaptor selector 144 of the current embodiment provides several functions. For instance, the dynamic adaptor selector 144 examines incoming messages 126 to determine information which might be useful in selecting the adaptors 136. It also either monitors or gathers QOS measurements related to the performance of system 100. As the adaptation subsystem 102 receives, generates, or otherwise accepts incoming messages 126, the dynamic adaptor selector 144 examines the QOS measurements, the intended recipients (and the source 104) of the incoming messages 126 and the message types associated with the sending users 101, the receiving users 101, and their communication devices. From such information, the dynamic adaptor selector 144 determines which adaptors 136 to use to change the incoming message 126 into adapted messages 128, 130, and 132 suitable for the intended recipients (and their associated communication technologies). It also determines an ordering for each resulting adaptor set 138, 140, and 142 to create the corresponding adapted messages 128, 130, 132.

These determinations can be based on rules stored in the rules module 146, database, etc. The rules stored therein define the conditions under which one or more adaptors 136 might be used to change the incoming messages 126 into adapted messages 128, 130, and/or 132. For instance, should a third party wish to add to the system 100 a new or modified communication technology, they can create a corresponding adaptor(s) 136 and rule(s) and store the same in (respectively) the adaptor library 148 and the rules module 146. When the dynamic adaptor selector 144 detects a new incoming message 126 it checks various conditions, reads the rules in the rules module 146, and applies the same to select the adaptors 136. These rules can specify the adaptors 136 (and/or types of adaptors) that some or all of the adaptors 136 should follow, precede, operate in parallel with, etc. In other words, the rules can enable the dynamic adaptor selector 144 to select an ordering of the adaptors 136 for creating a particular version of the incoming message 126 (that is, a particular adapted message 128). Moreover, because conditions can change and because the dynamic adaptor selector 144 can be cognizant of these changes in real, or near real-time, the dynamic adaptor selector 144 can respond to changing conditions. Hence, it operates in a dynamic manner without necessarily requiring users 101 to intervene when conditions change.

Still with reference to FIG. 1, the adaptation subsystem 102 can output the adapted messages 128, 130, and 132 toward the intended recipients along the corresponding communications links in system 100. It can also receive the responses 150 (if any). And, if some responses 150 arrive, adaptation subsystem 102 can process them in a manner similar to the manner in which it treats other incoming (from its perspective) messages. Thus, without necessarily requiring human intervention, communications subsystem 102 can accept incoming messages 126, adapt them as might be appropriate for various intended recipients, send the adapted messages 128 to those intended recipients, and process the responses 150. It can also do so while gathering QOS measurements and dynamically adjusting its operations responsive thereto and without need for human assistance or intervention.

Figure 2:
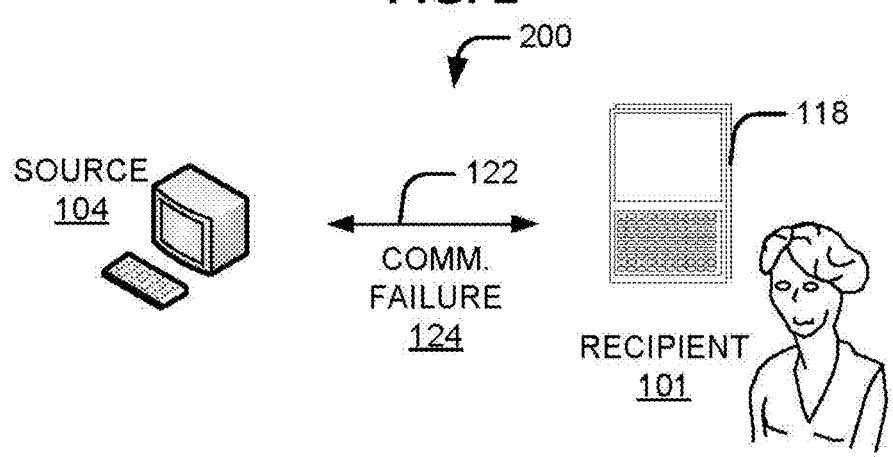
FIG. 2 illustrates another system for communicating using various disparate communication technologies.

FIG. 2 illustrates another system for communicating using various disparate communication technologies. More specifically, in heretofore available communication systems 200 a message 122 would be sent from a source 104 to a cellular phone 118 associated with a particular user 101. If 1) the message 122 as it left the source 104 happens to be compatible with the particular cellular phone 118, 2) the intended recipient happened to be using that communication device 118 at that time, 3) the communications technologies involved were compatible and available, and 4) a number of other compatibility and/or human-level preference-related issues happened to resolve successfully, the recipient would receive and be able to understand the message 122 as-sent. Thus, communication failures 124 would be unlikely to occur in this scenario. But, with the continuing proliferation of communication technologies, it is unlikely that all compatibility issues will be resolved successfully. Furthermore, system and network failures, weather, malware, hackers, human-level preference issues and a number of other factors can combine with technical compatibility issues to render delivery of the message 122 effectively uncertain. To improve the chances that messages 122 are effectively delivered to the intended recipient in a predictable form compatible with their human-level preferences, adaptation subsystems 102 (see FIG. 1) can be added to existing communication systems 200.

Figure 3:
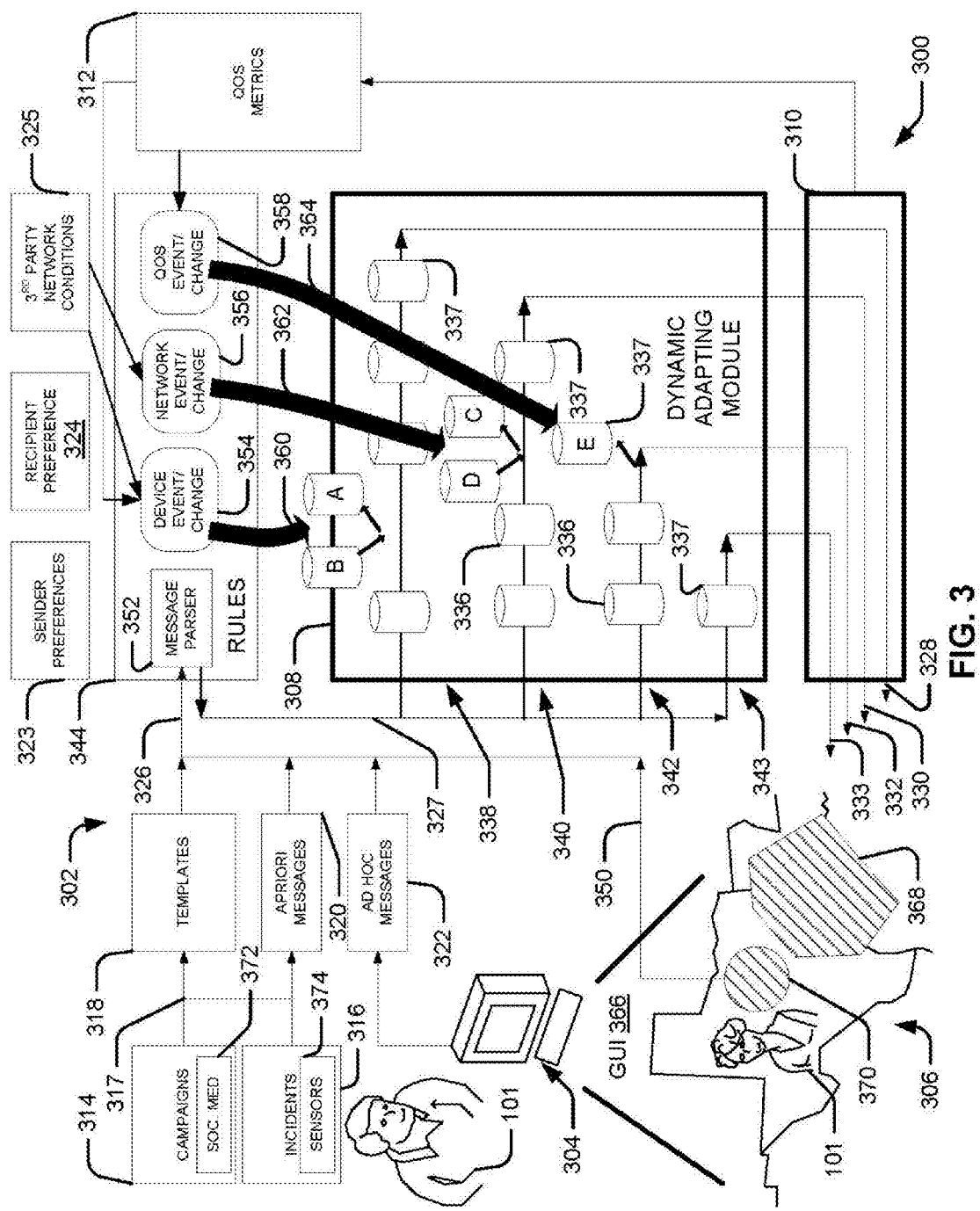
FIG. 3 illustrates another system for communicating using various disparate communication technologies.

FIG. 3 illustrates another system for communicating using various disparate communication technologies. More specifically FIG. 3 illustrates adaptation subsystem 302 which includes or communicates with dynamic adapting module 308, third-party networks 310, QOS metrics 312, campaigns 314, incidents 316, templates 318, apriori messages 320, ad hoc messages 322, sender preferences 323, recipient preferences 324, third-party network conditions 325, message content 327, analytics adaptor 337, message parser 352, device event/change 354, network event/change 356, QOS event/change 358, dynamic change 360, dynamic change 362, dynamic change 364, and GUI (Graphical User Interface) 366 which defines or accepts polygon 368 and circle 370.

In the current embodiment, the dynamic adapting module 308 is illustrated as currently executing adaptor sets 338, 340, 342, and 343. Furthermore, the dynamic adaptor selector 344 coordinates various dynamic changes 360, 362, and 364 to the adaptor sets 338, 340, 342, and 343 responsive to conditions in the communication system 300. These dynamic changes 360, 362, and 364 include the addition, removal, exchange or modification of the various adaptors 336 (and/or their orderings) in the adaptor sets 338, 340, 342, and 343 of the dynamic adapting module 308. Of course, while FIG. 3 illustrates the dynamic adapting module 308 as a particular entity it can be the case that the dynamic adapting module is distributed among various processors, computers, etc. No matter how the dynamic adapting module 308 happens to be configured, it functions to adapt incoming messages 126 from their as-is or as-received message types to message types deemed likely to result in the message (or the content thereof) reaching the intended recipients in useful form (including in many cases being in accordance with their human-level preferences).

The third-party networks 310 of the current embodiment reside outside of the communication subsystem 302 yet interface with it. Nonetheless, the third-party networks 310 include networks based on a number of different communication technologies including those represented by television broadcasting systems, sirens, loud speakers, cellular telephony systems, POTS systems, satellite-based systems, social networks, etc. The adapted messages 328, 330, 332, and 333 propagate through the third-party networks 310 as conditions in (or affecting) each of these networks permit. Indeed, FIG. 3 illustrates that adapted message 333 propagates further than adapted message 332, even further than adapted message 330, and yet further still than adapted message 330.

For instance, suppose a sender wishes to communicate with many people in a disaster area. The POTS system 114 might have failed completely meaning that messages 328 conveyed thereby go nowhere with zero penetration into the effected area. Some cellular towers though might still be operating in which case cellular telephone messages 330 might get to at least a few recipients thereby providing some penetration. An Internet server or two might still be operating meaning that some email messages 332 might get through to additional recipients thereby providing more penetration. Yet, despite the disaster, an A.M. radio message 333 might still be able to penetrate fairly deeply (to anyone with an A.M. radio no matter how primitive). The foregoing scenario, thus, demonstrates that for mass notification scenarios having multiple communication channels, outlets, technologies, etc. can be of value to those with a desire, need, want, etc. to communicate.

With continuing reference to FIG. 3, the analytic adaptors 337 of the current embodiment operate to generate the QOS metrics 312. More specifically, the dynamic adaptor selector 344 can insert analytic adaptors 337 into some or all of the adaptor sets 338, 340, 342, and 343 to gather QOS metrics associated with the incoming message 326 and/or the communication system 300. Some analytic adaptors 337 can insert cookies and/or other tracking mechanisms into the adapted messages 328, 330, 332, and 333 such that data regarding the (as received) adapted messages 328, 330, 332, and 333 can be sent from the recipients (or their communication devices) to a database, repository, etc. of QOS metrics 312.

FIG. 3 also illustrates certain campaigns 314. These campaigns 314 relate to business or business-like activities although the scope of the current disclosure includes other types of campaigns. Some campaigns 314 that can be included in adaptation subsystem 302 include advertising campaigns, marketing campaigns, fund raising campaigns, etc. As a result, these campaigns 314 have associated therewith certain message templates 318, certain apriori messages 320, certain recipients (or groups of recipients), etc. Moreover, users 101 who act as senders of incoming messages 326 can trigger the beginnings, endings, and certain events, milestones, etc. associated with the campaigns 314. Each of which can cause the adaptation subsystem 302 to generate corresponding incoming messages 326 and to also operate on them as it would other incoming messages 326.

Incidents 316 operate in manner some what similar to the way that campaigns 314 do. However, incidents 316 usually arise from unplanned, often unpredictable occurrences in contrast to campaigns 314. In other cases, though, an automated system could initiate an incident 316. A particular scenario that could cause a user, instead of an automated system, to initiate an incident 316 would be a new form of terrorist attack for which no automated system had been set up to detect. On the other hand, an automatic seismic detector could trigger an incident 316 associated with an earthquake without user 101 intervention. No matter how an incident gets triggered, adaptation subsystem 302 could respond by issuing an incoming message 326 based on a message template 318 or it could initiate one based on an apriori message 320.

Whether a campaign 314 or incident 316 happens to be involved, a notification 317 can trigger the adaptation subsystem 302 to instantiate a template 318 based message or a message prepared apriori by the sending user 101 (an apriori message 320). In cases in which a sending user 101 has designated that an apriori message 320 is desired (such as when some sensor triggers the message), the communication subsystem 302 sends the apriori message 320 to the dynamic adaptor selector 344 as an incoming message 326. In cases in which a sending user has designated that a template 318 based message is desired, the adaptation subsystem 302 generates a message based on the user-designated template 318. Of course, the adaptation subsystem 302 can populate the template 318 with data related to the applicable campaign 314 and/or incident 316. In addition, or in the alternative, the adaptation subsystem 302 can add recipients to the distribution list, remove them therefrom, or otherwise alter the distribution list in manners previously selected by the sender for such incidents 316 or campaigns 318.

With ongoing reference to FIG. 3, the adaptation subsystem 302 also accommodates ad hoc messages 322. These ad hoc messages 322 include those messages which a user 101 (or perhaps an automated system) generates without the aid of a template 318 or apriori message 320 stored within (or otherwise accessible to) the adaptation subsystem 302. For instance, a user 101 can manually enter an ad hoc message 322 and submit it to the adaptation subsystem 302. Such ad hoc messages 322 (as well as the templates 318 and/or apriori messages 320) can contain unstructured data and/or unsolicited inputs if desired.

Adaptation subsystem 302 also includes or maintains tables, databases, etc. which store sender preferences 323 and recipient preferences 324. These preferences indicate how various users 101 prefer to send and/or receive messages. As such, they can be manually entered by the users 101, an administrator, or others. In some embodiments, the adaptation subsystem 302 can monitor user 101 behavior to determine or learn their preferences and more specifically, those at a human level such as preferred languages, preferred application categories (for instance, email, chat, instant messenger, word processing applications), preferred applications within those application categories), etc.

With continuing reference to FIG. 3, the adaptation subsystem 302 also includes a table or database for storing third-party network conditions 325. In the alternative, or in addition, the adaptation subsystem 302 can communicate with such third party communications networks 310 (or rather their associated control computers) to obtain information regarding these third-party networks 310. Of course this table or database can also store information regarding conditions within the adaptation subsystem 302. More specifically, the third-party network conditions include information regarding the various pathways through the third-party networks, QOS metrics 312 for the same, costs for bandwidth on those pathways, (planned or unplanned) outage information, pricing, available bandwidth, etc. Moreover, various rules can be implemented to respond to changes to the foregoing information. In some scenarios, rules cause the adaptation subsystem 102 to detect changes in pricing, available bandwidth, etc. in various third-party networks 310 and/or services. Responsive thereto, these rules can cause the adaptation subsystem 102 to re-route various messages and/or negotiate new terms of service with the changed third-party network 310 and/or service.

With regard to the dynamic adaptor selector 344 of the current embodiment, it contains a message parser 352. The message parser 352 accepts various incoming messages 326 including those arising from templates 318, apriori messages 320, ad hoc messages 322 and/or messages arising from other sources or in other manners. The message parser 352 examines the incoming messages 326 and/or metadata associated therewith to determine certain information that can aid the dynamic adaptor selector 344 in its activities. For instance, the message parser 352 of the current embodiment examines the headers (or similar structures) of the incoming messages 326 and determines the intended recipients. In some scenarios, the message parser 352 could infer from context what certain attributes of the incoming message might be and create corresponding metadata with which to characterize the incoming message type. With this information, the dynamic adaptor selector 344 can access the recipient preferences 324 to determine how various recipients prefer their messages to be delivered. The message parser 352 can also parse the incoming messages 326, determine who the sender is, access their preferences amongst sender preferences 323; and apply those preferences when applicable. Moreover, the message parser 352 of the current embodiment parses the incoming message 326 (and/or its metadata) to determine the message type thereof. In some cases, the message parser also examines the source or channel through which the incoming message 326 arrives to aid in some or all of these determinations. The message parser 352 of the current embodiment makes the resulting information available to the adaptation subsystem 302.

Still with reference to FIG. 3, the adaptation subsystem 302 provides ways for the senders to select their intended recipients. For instance, the templates 318 and apriori messages 320 can provide pre-arranged groups of recipients and/or the campaigns 314 and/or incidents can be associated with groups of recipients if desired. Of course, senders can define their ad hoc messages 322 and the intended recipients thereof as they see fit within the capabilities provided by whatever message creation application they might be using.

In addition, or in the alternative, the GUI 366 can allow senders to select their recipients graphically. In some embodiments, the GUI 366 can present an image corresponding to a region 306 (which the sender can select). Over the image of the region 306, the GUI 366 can allow the user to draw a polygon 368, circle 370, or control of some other arbitrary or user-defined shape. Responsive to that control, the GUI 366 can cause the sender's communication device to select those recipients known to be within the corresponding area in region 306 or can examine the user preferences 323 and 324 to determine which users wish to be included in such groupings. Thus, as illustrated by FIG. 3, the polygon 368 could correspond to a hurricane watch or warning zone and all persons within those areas could be grouped as intended recipients of an apriori message 320 regarding hurricanes in that area. In another scenario, a company might wish to initiate a campaign centered on a particular city (perhaps Austin, Tex.). In which case, a user in the company could draw the circle 370 about Austin thereby defining as recipients for that campaign 314 a population in and around Austin, Tex. Thus, communication system 300 can treat the polygon 368 (or other shape) as an input from the user. However, the system 100 can also cause a corresponding output to appear on the GUI 366 so that the user can see and/or adjust their selection.

For an ad hoc message 322, the adaptation subsystem 302 of the current embodiment can operate as follows. At some point a user 101 decides to send the ad hoc message 322. That user 101 accesses a source 304 communication device of some sort that might be any type of communication device now known or yet to be developed. Moreover, that user 101 can select a communication application of some type that would also be selected from among the known (and yet to be developed) communication applications. Of course, the user could also select other human-level aspects of the message (for instance, the user could start typing the message in English or could speak the same in English thereby exhibiting two human-level preferences: speech verse text and English verse another human language). Thus, from the perspective of the adaptation subsystem 302, the message type of the ad hoc message 322 would be an arbitrary message type. Nonetheless, the user 101 prepares the ad hoc message (including defining its recipients if desired) and sends it via the adaptation subsystem 302.

The adaptation subsystem 302 routes the ad hoc message 322 to the message parser 352. Or, if desired, the sending user 101 can direct the ad hoc message toward the message parser 352. In either case, the message parser 352 can separate the ad hoc message 322 into two or more parts: one including the content of the ad hoc message 322 and the other containing the header, metadata, etc. associated with the ad hoc message 322. The content 327 it forwards to the dynamic adapting module 308 while retaining the header (et al.) for further consideration.

The message parser 352 can also extract from the ad hoc message 352 the list of intended recipients and the sender (if desired). The message parser 352 can also identify the message type of the incoming message if it is not completely provided or defined in its header. Of course, the message parser 352 can be configured to detect many known message types and can be configured to make "best fit" determinations when a message of a partially or entirely unknown message type arrives. In addition, or in the alternative, those who develop new message types (in whole or in part) can register their message types with the adaptation subsystem 302 so that the message parser 352 can be configured to recognize and respond to new corresponding message types.

With some or all of that information in hand, the dynamic adaptor selector 344 applies the rules from the rules module to the ad hoc messages 322. More specifically, the dynamic adaptor selector 344 looks up the recipient and sender preferences 324 and 323. At this point the dynamic adaptor selector 344 therefore knows the message type of the ad hoc message 322 and the message types that the recipients prefer. Moreover, the dynamic adaptor selector 344 has access to the rules in the rules module 146. The dynamic adaptor selector 344 considers the various rules, determines which ones are applicable, and applies them to the ad hoc message 122 as input to the message parser 352. Thus, the dynamic adaptor selector 344 selects a set of adaptor sets 338, 340, 342, or 343 to change the ad hoc message 122 from its incoming message type to one or more of the adapted messages 328, 330, 332, and/or 333.

A few words regarding message types might be in order at this juncture. Message types encompass a number of variables that define a message (excepting its content). More specifically, a message is often created in a human language, is formatted (and has a syntax) according to the application which was used to create it, and (at least at some points) incorporates features related to the technologies used to accept, record, transport, etc. it. Of course, a variety of frameworks or models exist which attempt to categorize each one of the various factors that contribute to a particular message type. For instance, the OSI model defines seven "layers" of communication systems. Each layer of which might affect one or more message types due to the communication technologies applicable at that layer. These OSI layers include the application, presentation, session, transport, network, data link, and physical layers. Likewise, there exist various layers within the TCP/IP model. Plus, various manufacturer/vendors have created their own proprietary messaging frameworks. For instance, Apple Inc. has created a proprietary set of networking protocols used in its communication devices. Of course, user preferences also play a role at a human-level and perhaps elsewhere. All of these factors contribute to the number of permutations of combinations of technologies potentially associated with any given message.

Referring still to FIG. 3, the ad hoc message 322 as received by the message parser 352 will have a message type defined by one combination of the foregoing sets of protocols, human languages, sender preferences 323, recipient preferences 324, etc. Each of the recipient-message-types will have another combination of protocols, languages, recipient preferences 324, etc. associated therewith. The dynamic adaptor selector 344 therefore detects the incoming message-type, identifies the recipient message type(s), and (by applying the rules) selects a set of adaptors 336 with which to adapt the ad hoc message 322 into one or more adapted messages 328, 330, 332, and/or 333.

With continuing reference to FIG. 3, the message parser 352 of the current embodiment has identified that the ad hoc message 322 has at least 4 recipients associated therewith. Hence, it has selected four adaptor sets 338, 340, 342, and 343 to apply to the ad hoc message 327. Of course, it could be the case that more than four intended recipients exist for the ad hoc message 322. But, it might also be the case that some of the recipient-message-types corresponding to these recipients happen to be identical. To detect such cases, the dynamic adaptor selector 344 can (after determining the recipient-message-types involved) compare the various recipient-message-types to identify duplicates (or near duplicates). Thus, the dynamic adaptor selector could select a particular adaptor set 338, 340, 342, or 343 and apply it to the ad hoc message 322 for such a group of intended recipients with the same or similar recipient-message-types. Where recipient-message-types have enough commonality the dynamic message adaptor 344 can group the common adaptors 336 into a shared sub-pathway for the corresponding (and intermediate) versions of the message. The output of which would then branch to the parallel pathways and/or the adaptors 336 therein selected to finalize the corresponding adapted messages 328 (for instance).

The dynamic adaptor selector 344 can also place the adaptors 336 in each of the sets 338, 340, 342, and 343 in to a sequence or order as the rules might determine. In some embodiments, the ordering might result from a prioritization scheme implemented in the dynamic adaptor selector 344. Or, the ordering might result from an interplay between both and/or other factors. In most cases, though, the dynamic adaptor selector 344 selects the adaptors 336 and loads them into the dynamic adapting module 308 of the current embodiment.

As soon as the first adaptor 336 of a given set of adaptors 338, 340, 342, or 343 is loaded, adaptation of the incoming message 326 can begin. For instance, suppose that a fully or partially formatted email message arrives at the message parser 352. Consider further that one of the intended recipients prefers receiving a tweet in the given situation. The rules might cause the dynamic adaptor selector 344 to first apply an email-to-Twitter adaptor to parse the ad hoc message 322 to a bare minimum of characters of content 327. This adaptation might occur first because the author of the adaptor 336 (and corresponding rules) realized that stripping the content 327 of the ad hoc message 322 to a minimal Twitter message might save processing by subsequent adaptors 336. Thus, the email-to-tweet adaptor 336 could operate early in the order with its output being a string of 140 or fewer characters.

The next adaptor 336 applied via the rules might then be a language translation adaptor. The message parser 352 might have recognized the possible desirability of such an adaptor selection because of a rule that watches for incoming messages in one human language paired with a recipient who has a preference to receive messages in another human language. Thus, the second adaptor 336 to be applied via adaptor set 338 could be a language translation adaptor. Other adaptors 336 could then be selected via the rules and designated for the adaptor set 338 in accordance with the rules. Of course, the author might have also wanted to reverse the ordering such that the translation happens first and, then, the shortening to a tweet occurs.

Adaptor set 340 might represent a simpler adaptation of the input ad hoc message 322 than previously disclosed. Perhaps, in this situation, the corresponding recipient(s) prefer to receive messages in the language in which the ad hoc message 322 happens to have been sent or has fewer preferences for which adaptation is desired. Adaptor set 342 illustrates an even simpler adaptation scheme in which application of the rules results in only two adaptors 336 being applied to the content 327 of the ad hoc message 322.

With continuing reference to FIG. 3, adaptor set 343 illustrates a case in which only one adaptor 336 happens to have been selected for the adaptation desired for a particular recipient. Indeed, it is possible where the detected message type of the ad hoc message 322 and a particular recipient message type are the same that no adaptors 336 are applied to the content 327 of the message. Instead, the dynamic adapting module 308 might pass the ad hoc message 322 to that recipient as the message parser 352 received it. However, it might also be the case that an administrative user of the adaptation subsystem 302 might desire to apply an analytic adaptor 337 to each adapted message 328, 330, 332, and 333 before it is transmitted or otherwise sent to the third-party networks 310 for delivery. That administrative action could be applied to even those messages that pass through the adaptation subsystem 302 without otherwise being adapted.

Still with reference to FIG. 3, similar processes could unfold when a campaign 314 or incident 316 triggers a message. In the case of a campaign, a human user 101 might determine that the time has arrived to send a message to the targets of the campaign. Or that decision might have been automated. However, the decision occurs to send a campaign related message, the adaptation subsystem 302 allows the user to select whether a template 318 or an apriori message 320 is to be sent. In the case that an apriori message 320 is to be sent, the adaptation subsystem 302 causes that message to be generated and routed to the message parser 352. The message parser 352 could default to handling the apriori message 320 as disclosed with reference to ad hoc messages 322. Or, if desired, the creator of the campaign 314 (or the apriori message 320 or template 318) could have established a particular rule in the rules module 146 related to the campaign 314. Such a pre-arranged rule could potentially speed the processing of the resulting message since it could cause the dynamic adaptor selector 344 to apply that rule and then trigger the dynamic adapting module 308 to immediately commence processing of the resulting message (without waiting for the dynamic adaptor selector 344 to consider other rules).

Incidents 316 could be handled in a somewhat similar manner although the trigger for the incident might not be manual. Instead, some instrument, metric, or sensor 374 might establish the occurrence of an incident 316. For instance, a user 101 could have established that any reading above some threshold on a particular seismometer (or sensor 374) would indicate that an earthquake is occurring. Hence, an earthquake incident could be declared with either a template-based or apriori incoming message 326 being issued. Or, if some third-party network 310 suffered a failure of some type, the dynamic adaptor selector 308 could respond by routing adapted messages around the affected communication links. In this situation, the rules might also indicate that such occurrences be detected by a given sensor 374 and that a set of adaptors 336 corresponding to the new pathway be applied to the message.

FIG. 3 also illustrates that a particular campaign 314 might involve some social media aspects. For instance, a company might wish to launch an advertising campaign 314 employing Facebook, Twitter, and/or LinkedIn messages among other types of social media 372 messages. The company could have set up one or more templates 318, apriori messages 320, and/or other messages of desired social media 372 types which the system 100 could populate with data pertaining to the current campaign 314. Each such social media 372 message would then propagate through communication system 300 with appropriate adaptors 336 being selected according to circumstances (and the applicable rules) by the dynamic adaptor selector 344. Responsive to the various social media 372 messages sent by communication system 300, the various recipients might send responses 350 back to the communication system 300 as desired which when then be processed as disclosed elsewhere herein.

For instance, suppose that a municipality in an area prone to flash flooding were to launch a mobile application for alerting users to suddenly appearing high water. The municipality could launch a campaign 314 that would result in numerous messages being sent to many users alerting them to the existence of the application and asking that reports of high water be sent to a given address, phone number, etc. Users who are out and about in the flood prone areas could then generate responses 350 of ad hoc nature reporting various instances of high water. Rules could cause dynamic adaptor selector 344 to identify such responses received by the communication system 300 and route these responses to some module. The module, program, application, etc. could cull from the ad hoc responses 350 unstructured data such as photographs, video, etc. and associate them with free-form reports accompanying the unstructured data in the responses 350. From the collection of such responses 350, the module could build a potentially comprehensive view of the flooding situation in the area.

Thus, FIG. 3 illustrates the dynamic nature of the adaptation subsystem 302 and more particularly the dynamic adaptor selector 344 and the dynamic adapting module 308. As those skilled in the art understand, communication systems 300 can be complex systems subject to predictable and unpredictable events. A particular user 101 might switch off one device (such as their cellular phone) and turn on another (for instance, a laptop computer). Or a storm might obliterate portions of one or more third-party networks 310. Thus, adapted messages 328, 330, 332, and 333 targeted for the first device might fail to arrive or might fail to arrive in a timely manner. In addition, or in the alternative, one of the third-party networks 310 (or a portion thereof) might fail resulting in communication failures for messages targeted to or adapted to travel over the affected portion(s) of the failed third-party network 310. In a somewhat similar vein, a QOS metric 312 associated with some portion of the communication system 300 might change thereby crossing some quality threshold (either for better or for worse).

Thus, rules can be implemented in rules module 146 to cause dynamic adaptor selector 344 to respond to such events, changes, etc. For instance, a rule could exist that causes QOS metrics 312 to be gathered regarding which communication devices various users 101 might be using (or at least, which ones are in communication with the communication subsystem 302). Should these QOS metrics indicate that a particular communication device associated with a particular user has been deactivated, lost communication, or its communication capabilities have degraded, a rule could cause the dynamic adaptor selector 344 to recognize that a device event/change 354 has occurred. As a result, the dynamic adaptor selector 344 could implement dynamic change 360 thereby swapping out device-related-adaptor 336A for a different device-related adaptor 336B. The intent of the swap being to perhaps restore, improve, modify, etc. the ability to communicate with that user 101 despite their change of communication devices.

Similarly, a rule and/or QOS metrics 312 could be implemented to monitor the communication system 300 for network events/changes 356. Thus, should one of the third-party networks 310 suffer an outage (whether total or partial), the dynamic adaptor selector 344 could detect the network event/change 356, substitute one network adaptor 336D (associated with the failed third-party network 310) for another network adaptor 336C (associated with another third-party network 310). Thus, even though a particular adapted message 330 could not be delivered per the original adaptor set 340, the modified adaptor set 340 could adapt that message for delivery via a substitute third-party network 310. Of course such network—based adaptors might also cause the message to be routed to hardware suitable to deliver the message to the newly associated third-party network. Similar on-the-fly adaptor 336 substitutions can be executed for mere degradations of the third-party networks 310.

Yet another illustrative scenario involves QOS related events and or changes. For instance, another rule could be registered with the rules module 146 to monitor QOS metrics 312 for QOS events/changes 358. In one scenario, if delivery of a particular adapted message 333 happens to be taking too long on an otherwise healthy third-party network 310 and a particular healthy communication device, the dynamic adaptor selector 344 could detect that type of QOS event/change 358 and respond accordingly. In some cases that might mean substituting adaptors 336. In other cases that might mean adding an adaptor 336 to an adaptor set. Yet, in other cases, it might result in removing (without replacing) an adaptor 336E from an adaptor set 342. For instance, suppose that a QOS metric for a particular third-party network 310, communication device, etc. improves. In that case, the adaptation associated with a particular adaptor 336E of a particular adapted message 332 might no longer be necessary or desirable. That adaptor 336E could then be removed from the adaptor set 342 thereby conserving computing resources associated with the dynamic adapting module 344. In addition, or in the alternative, a QOS metric could relate to pricing information for use of a third-party network 310. Should it change, various rules might cause the adaptation subsystem 302 to negotiate terms of service with that third-party network 310 and/or to route traffic message traffic to/from it.

With continuing reference to FIG. 3, the dynamic adapting module 308 of the current embodiment will select various adaptors 336 responsive to the message type of the incoming message 326, the message type(s) preferred by the recipient, and conditions in and/or affecting the communication system 300. More specifically, device, network, and QOS events/changes 354, 356, and 358 can cause the dynamic adaptor selector 344 to alter the mix of adaptors 336 (and routing mechanisms) executing in the dynamic adapting module 308. Thus, even though incoming messages 326 of disparate message types might be targeted at a variety of recipients (who collectively prefer that set of disparate message types), the adaptation subsystem 302 can adapt the incoming messages 326 and deliver them in a more robust, reliable manner than heretofore possible.

Of course, at some point, one or more of the recipients might respond to one of the adapted messages 328, 330, 332, or 333. The response 350 can be routed to the adaptation subsystem 302 just as any other incoming message 326. The dynamic adaptor selector 344 would then parse the response 350, select an appropriate set of adaptors 338, 340, 342, or 343 and adapt and deliver the response 350 as an adapted message 328 intended for the sender of the original incoming message 326 and perhaps others. Having considered embodiments providing illustrative communication systems, it might now be helpful to consider methods in accordance with various embodiments.

Figure 4:
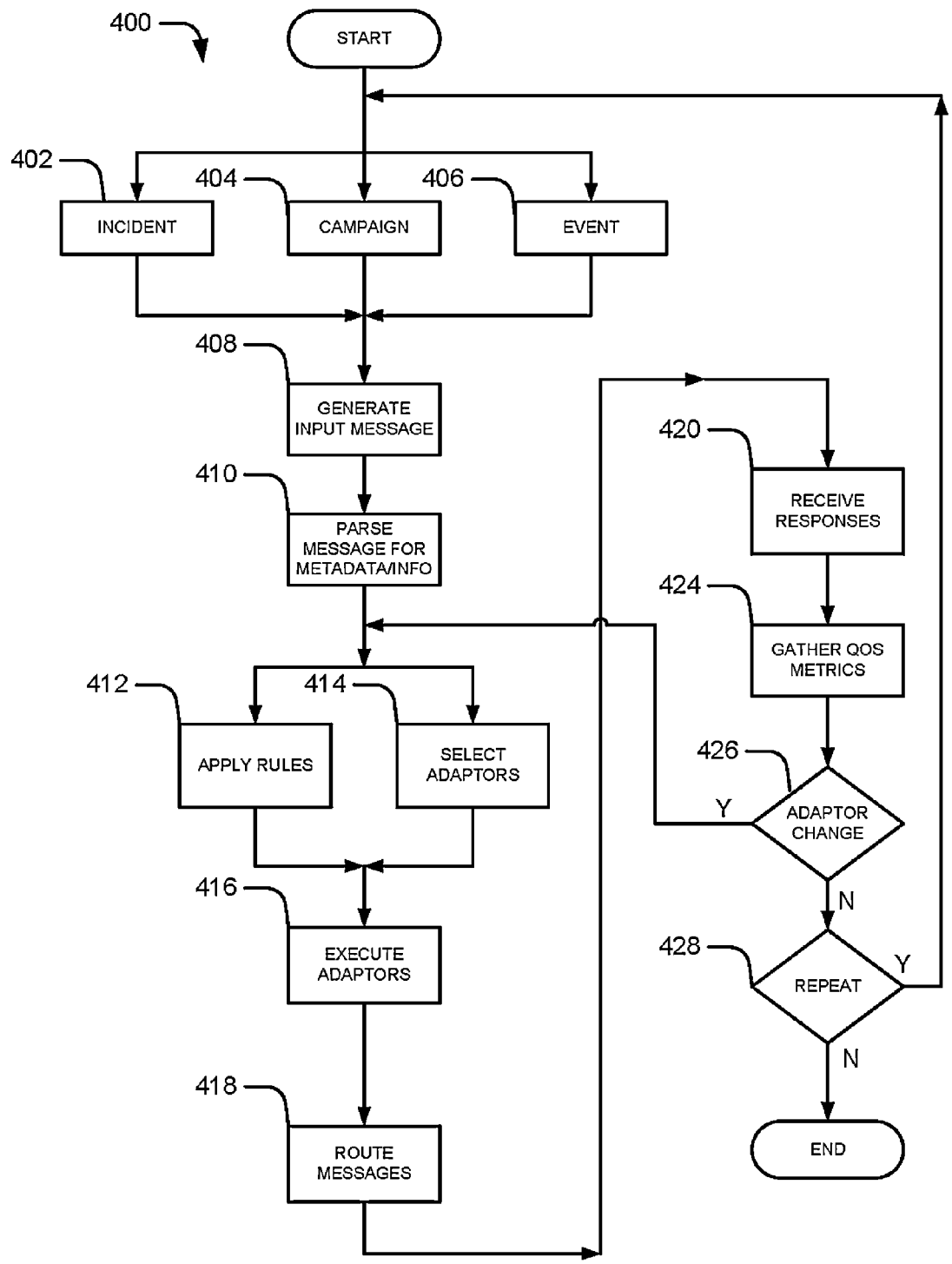
FIG. 4 illustrates a flowchart of a method for communicating using various disparate communication technologies.

FIG. 4 illustrates a flowchart of a method for communicating using various disparate communication technologies. More specifically, FIG. 4 illustrates a method wherein a person, company, organization, automated process, etc. determines that it might be desirable to send a mass communication to a large number of intended recipients. These recipients may or may not belong to any particular group or organization, might be widely distributed geographically, and might be using (or prefer to use) disparate communication technologies through which they receive their messages. They might also have disparate human-level user preferences associated with their communications.

With continuing reference to FIG. 4, method 400 begins with one or more message triggers. In some cases an incident 316 might occur or be detected as shown by reference 402. In other cases, an active portion of a campaign 314 might commence. See reference 404. In the alternative, or in addition, an event 354, 356, or 358 might occur or be detected (see reference 406). One or more of these triggers might therefore suggest a desire on the part of a user 101 to send a message to numerous recipients. As a result, the user 101 (or the adaptation subsystem 302) generates an incoming message 326 from either a template 318 or an apriori message 320 although the incoming message 326 could be an ad hoc message 322. Of course one or more types of social media 372 and/or sensors 374 might be involved in generating the desire for a message or messages. See reference 408. In any case, the incoming message 326 of embodiments will have associated therewith certain attributes whether expressly defined or inferable from the context of the message. These attributes, or metadata regarding the same, can be used to select rules with which to select various adaptors.

For each such message, message parser 352 accepts the incoming message 126 and begins parsing it as shown at reference 410. More specifically, message parser 352 can parse the incoming message to identify information, attributes, etc. likely to help identify (or at least relate to) the incoming message type (and perhaps suitable outgoing message types as well). Of course some of this metadata can be inferred from context and/or other sources. For instance, a message originating from a POTS telephone would be of a message type at least defined by an audio or perhaps analog message type. Moreover, dynamic adaptor selector 344 can determine various user (sender and/or receiver) preferences to apply in selecting the various adaptors as disclosed elsewhere herein). The dynamic adaptor selector 344 applies various rules from the rules module 146 to the parsed information (the metadata) which it has obtained from the incoming message 326 and/or inferred from its context (see reference 412). As a result of applying the rules, the dynamic adaptor selector 344 selects and orders the various adaptor sets 338, 340, 342, and 343 that will likely suffice to adapt the incoming message 326 to a corresponding set of acceptable message types for the various recipients. See reference 414.

The dynamic adaptor selector 344 loads the selected adaptors 336 into the dynamic adapting module 308 in the sets 338, 340, 342, and 343 in the orderings in which the applicable rules indicate they are to be executed. Meanwhile, the message parser 352 passes the content 327 of the incoming message 326 to the dynamic adapting module 308 which then executes the adaptors 336 in the various adaptor sets 338, 340, 342, and 343 and in the indicated orders or sequences. See reference 416. In addition, the dynamic adapting module 308 routes the adapted messages to the third-party networks 310 associated with the various adaptor sets 338, 340, 342, and 343. See reference 418. Of course, there might be times that responses are received and treated as additional incoming messages 326 as shown at reference 420. Additionally, the adaptation subsystem 302 might have instrumented the original message (of a particular response) so that the response is recognized as a response.

Note that the communication subsystem 302 gathers QOS metrics 312 and determines, via the rules, whether an adaptor change might be desirable as method 400 unfolds (see reference 424). If so, method 400 can repeat from references 412 and/or 414 whereby the adaptor sets 338, 340, 342, and/or 343 might be modified according to the rules. If not, method 400 can continue as indicated at reference 426. Note also that method 400 can operate with respect to more than one message at a time and, indeed, can be operating at differing references for differing messages if desired. Moreover, method 400 can repeat in whole or in part as conditions warrant it, a user desires it, some message trigger occurs, another message arrives, and/or method 400 can repeat in whole or in part. Otherwise, method 400 can end. See reference 428.

Figure 5:
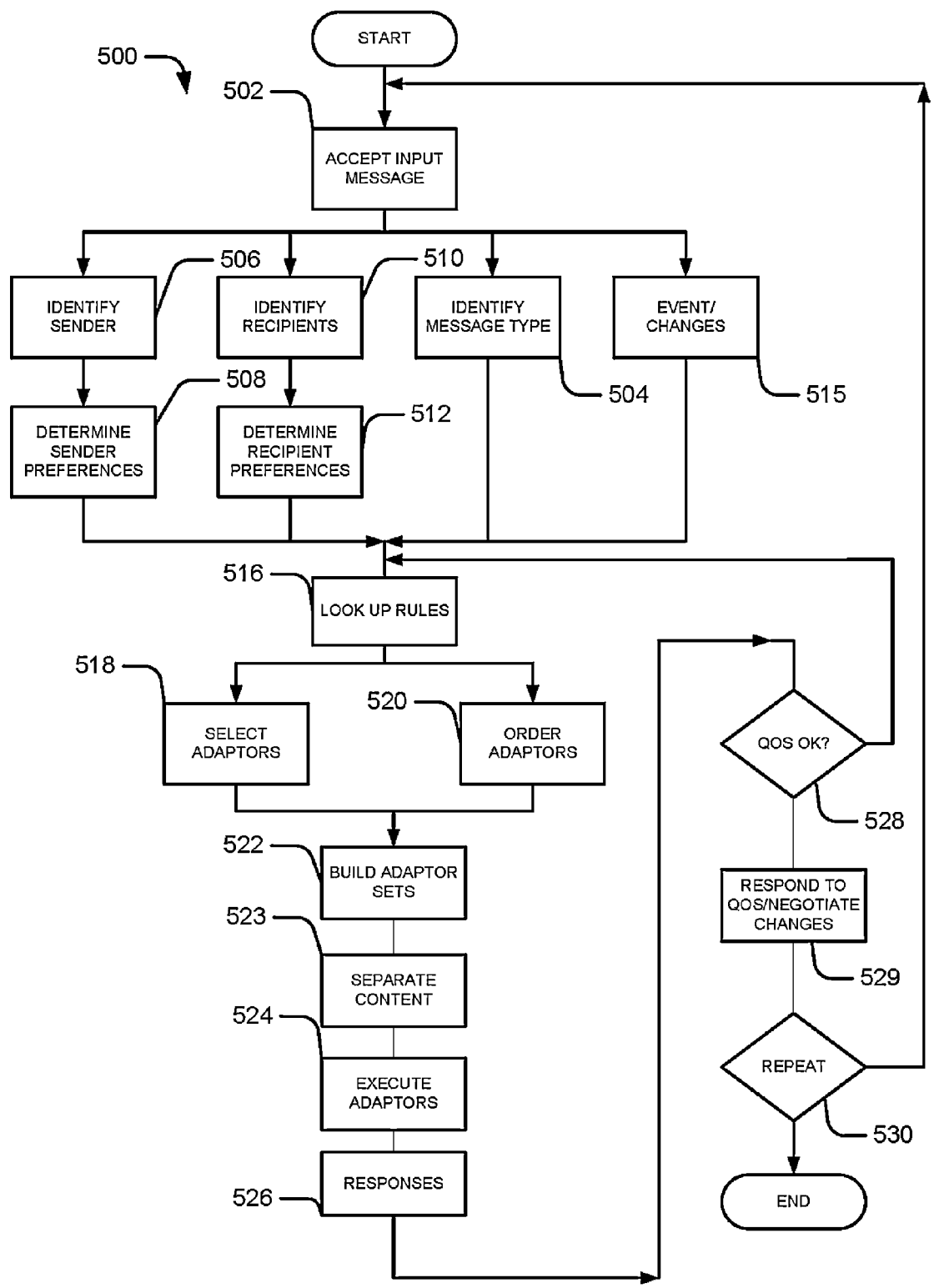
FIG. 5 illustrates a flowchart of another method for communicating using various disparate communication technologies.

FIG. 5 illustrates a flowchart of another method for communicating using various disparate communication technologies. Method 500 can begin when message parser 352 accepts an incoming message 326 from some source. See reference 502. The message parser 352 then examines the incoming message 326 and determines whether it complies with one or more known message types by determining and/or examining its attributes. If not, the message parser 352 might select a best-fit message type for the incoming message 326. In the alternative, or in addition, the message parser 352 can apply various rules from the rules module 146 (selected based on the message attributes) to determine how to handle an incoming message 326 of unknown or uncertain message type. See reference 504. In any case, the message parser 352 of the current embodiment attempts to parse the incoming message 326.

More specifically, the message parser 352 parses the incoming message 326 and identifies the sender (see reference 506). With the sender identified, the message parser 352 looks up the communication preferences of the sender as illustrated by reference 508. In parallel, if desired, the message parser 352 determines the identities of the various recipients and looks up their communication preferences as shown, respectively, at reference 510 and 512. Furthermore, the dynamic adaptor selector 344 can determine (via application of various rules) whether an event 354, 356, or 358 has occurred. See reference 515.

With the foregoing types of information as inputs, the dynamic adaptor selector 344 can look up which rules apply to the incoming message 326. Moreover, it can use the metadata (for instance, attributes, user preferences, and the like) which it parsed from the incoming message and/or inferred from context. See reference 516. It then, according to the applicable rules, selects the adaptors 336 and orders them as shown at, respectively, references 518 and 520. The dynamic adaptor selector 344 can then build the adaptor sets 338, 340, 342, and/or 343 called for by the rules. See reference 522.

In the meantime, the message parser 352 can identify the content 327 of the incoming message 326 and forward it to the dynamic adapting module 308 as indicated at reference 523. From there, in the current embodiment, the dynamic adapting module 308 can execute the adaptors 336 in the adaptor sets 338, 340, 342, and 343 and in their respective orderings to produce the adapted messages 328, 330, 332, and 333. See reference 524.

The adaptation subsystem 302 can then await one or more responses 350 from the various recipients. If a response 350 is received, the adaptation subsystem 302 can process the response as it would any other incoming message 326. It can also, having determined that a particular incoming message 326 is a response 350 to a previous incoming message 326, save an indication that that particular response was received and acquire QOS metrics 310 and other metrics regarding the response. For instance, it can compile statistics related to how many recipients have responded, the time it took, etc. See reference 526.

As suggested above, while method 500 occurs, the adaptation subsystem 302 can be gathering QOS metrics 312. If the QOS metrics 312 are outside of acceptable limits (being either above or below some selected thresholds) then method 500 can repeat from reference 516 at which various rules are applied to determine how to respond to the QOS event/changes 358. For instance, if the QOS metrics 312 which do not meet the limits relate to a third-party network 310 (or service) then the adaptation subsystem 302 can negotiate with that third-party network 310 (or others) for different service terms. If not, method 500 can repeat in whole or in part by, for instance, waiting for another message to process. See references 528 to 530. Otherwise, method 500 can end.

FIG. 6 illustrates a flowchart of yet another method for communicating using various disparate communication technologies. Method 600 illustrates one of many ways in which a user 101 can send a mass notification to even a worldwide team and which is intended to reach each recipient at a particular local time peculiar to the corresponding recipient. More specifically, the user 101 can log in to the adaptation subsystem 302 (if security or access control is desired). See reference 602. Of course, things other than users can cause a message or messages to be sent. For instance, various sensors, devices, incidents, campaigns, etc. can cause communication system 300 of embodiments to generate and/or process messages. If some such device does initiate (or otherwise participate in method 600) that device and/or the adaption subsystem 302 can be configured to provide a corresponding "login" or access to the adaptation subsystem 302. Next, in the current embodiment, the user 101 can select from a menu either a particular incident 316 or a particular campaign 314 with which the message is associated. Of course, the message could also be an ad hoc message 322 unaffiliated with any particular incident 316 or campaign 314. See reference 604. For scenarios in which a device participates in method 600, the device and/r adaptation subsystem 302 can be configured to detect and respond to user selected incidents, campaign events, etc. with template-based and/or apriori messages.

Method 600 can continue with the adaptation subsystem 302 presenting to the user a list of groups and/or individual recipients to whom the message should be sent. For scenarios in which a device participates in method 600, it can be configured to respond to such lists and/or the particular incident, campaign event, etc. can cause the adaptation subsystem 302 to select a corresponding list of recipients. See reference 606. In addition, or in the alternative, the communication subsystem 602 can present to the user 101 a graphical representation of some geographic region. If the user selects the geographic option, then the user can graphically select an area in the region by drawing either a circle 370, polygon 368, or some other shape indicating a region into which to send the message. In some embodiments, the communication subsystem 302 presents a list of regions into which to send the message from which the user 101 selects the desired region or regions. See reference 608. Either way, the user 101 can select the recipient(s) of the message. See reference 610.

The user 101 can then select from among the templates 318 and apriori 320 messages or can indicate that they wish to create an ad hoc message 322. Regarding templates 318, some of them can come associated with a particular group or community of recipients and can be pre-defined to be sent in one or more selected languages. In the current embodiment, the communication subsystem 302 can present the template 318 (in one or more of the selected languages) thereby enabling the user 101 to customize the template-based incoming message 326. Moreover, the communication subsystem 302 can present to the user 101 an option whereby the user 101 indicates a desire to have the resulting message translated (and into which languages). Note that if a translation(s) is requested by the user 101 or is suggested by the rules, the dynamic adaptor selector 344 of the current embodiment will select the appropriate adaptors 336 to affect the translation during its adaptation. See reference 612.

Moreover, as illustrated at reference 614, the adaptation subsystem 302 can present to the user 101 options associated with selecting the communication media over which to deliver the message. Moreover, some templates/communities can have associated therewith one or more pre-selected communication media through which to deliver associated messages. These communication media/technologies include, but are not limited to, email, SMS, voice (over a telephony system whether POTS, PSTN, VOIP, etc.). The communication media/technology can also include social networks such as Facebook, Twitter, LinkedIn, various blogs, etc. They can also include device-oriented communication media such as those associated with desktop computers (LAN, WAN, etc.), automated and/or networked signage, cellular telephones, etc. Other available communication media include sirens, alert beacons, fire alarms, etc. which can be considered either legacy, analog, or both types of communication media. Note that should a user wish to add a communication media/technology to those available in the adaptation subsystem 302, they can do so by registering appropriate rules, adaptors, etc. with the adaptation subsystem 302. Of course, if a user creates a technology requiring new hardware, that hardware can be added to the adaptation subsystem 302 rather than to each of the third-party networks 310 and or communication devices in use in the communication system 300. Similar provisions can be made for other human-level preferences. For instance, the user can indicate the human language to be used, the application types to employ, specific applications within those types, etc. Thus, communication systems 300 allow users flexibility in choosing which human-level preferences they use to send messages.

In scenarios in which a device participates in method 600, that device and/or the adaptation subsystem 302 can be configured to select the communications medium/media over which the message(s) are to be sent. Moreover, if desired, the adaptation subsystem 302 can be configured to test the corresponding communication paths and/or inquire of the third party networks 310 whether availability, bandwidth, etc. exists for such communication paths. Adaptation subsystem 302 can also, or in the alternative, query some or all of the third party networks 310 (even those not necessarily selected for delivery of the message) to determine the current contractual terms related to the delivery of the message. Adaptation subsystem can, responsive to the QOS parameters that might be affected by the current terms, re-route the message, negotiate for better terms, etc.

In some embodiments, the communication subsystem 302 can also present to the users 101 options relating to scheduling the delivery of a message to its recipients. For instance, one option could be delivery of the message without delay (other than that associated with its progress through the communication system 300). In other words, delivery in real or near-real time. Another option could allow for delivery of the message to one or more recipients at a given global time irrespective of the time zone(s) in which the recipients and/or sender might be located. Yet another option allows for the sender to select that some or all of the various versions of the message be delivered at a particular local time (each recipient receiving the message at that time, their local time). Thus, the user 101 can select from among these options to schedule delivery of the message with the dynamic adaptor selector 344 selecting appropriate adaptors 336 to affect the scheduled deliveries. Moreover, these scheduling options can also be considered human-level preferences although devices participating in method 600 can also be selected to select or define message delivery times. See reference 618.

At reference 620, FIG. 6 illustrates that method 600 includes allowing the user 101 to confirm that they wish the message to be sent. In some cases, the adaptation subsystem 302 could therefore present to the user (and/or participating device) the message as-built according to the sending user's selections and/or preferences. The user 101 (and/or participating device) could then confirm to the adaptation subsystem 302 that the message is acceptable or not. If the users 101 seek to make changes to the message, method 600 can repeat in whole or in part as indicated at reference 620. But, if desired, method 600 can proceed with the dynamic adapting module 308 adapting the message for delivery and sending the resulting message versions to the third-party networks 310 for delivery. See reference 622. Method 600 can then be repeated or it can end as might be desired.

FIG. 7 illustrates a flowchart of still another method for communicating using various disparate communication technologies. Method 700 of the current embodiment can begin by adaptation subsystem 302 receiving an incoming message 226 at reference 702. If more than one group of users (or more than one geographic) area has been selected to which to target the incoming message 326, the adaptation subsystem 302 can place the recipients in each group onto a master recipient list. Furthermore, the communication system 302 can be configured to parse the master list of recipients and remove duplicates to, for instance, reduce downstream processing. See reference 704.

In some embodiments, the adaptation subsystem 302 can retrieve communication preferences of the sending user 101 (and of the receiving users 101 if desired). If those preferences, or selected options associated with a particular incoming message 326 indicate some scheduling preference (for instance, the message is to be delivered at some specific local time for each recipient), then the adaptation subsystem 302 can retrieve the time zones in which each recipient is currently located and other pertinent attributes of the users 101 involved. For instance, it can retrieve a list of communication "values" associated with each recipient. These values can include such information as their POTS phone numbers, cellular telephone numbers, fax numbers, email addresses, Twitter addresses, social network identifiers, etc. See reference 706. With continuing reference to FIG. 7, method 700 can continue by searching the list of communication values for duplicate entries. In this manner, the number of messages being sent to any given device (and/or account, address, user, etc.) can be reduced to one if desired. It might also be worth noting that some or all of these communication values could reflect certain human-level preferences such as at which phone number or email address a user might wish to be contacted. See reference 708.

Next, the dynamic adaptor selector 344 of the current embodiment selects those adaptors 336 which the rules from rules module 146 indicate would be suitable for this particular message. The selection, of course, can be based on the communication technologies involved, user preferences, real-time or near real-time QOS metrics 312, etc. Depending on the message type of the incoming message 326 and these other considerations, the selected adaptors 336 can include communication adaptors 336 to adapt the incoming message for delivery as an SMS message, a voice message, a fax message, an email message, etc. over appropriate communications media. Communication adaptors 336 typically adapt the message so that it is compliant with the communication medium/media over which it is expected to be delivered to the recipient/communication endpoint. Thus, they often remove, add, and/or modify pre-message and post-message constructs associated with the message.

Note also that the rules can determine the order in which the adaptors 336 will be applied to the incoming message 326 and any branches in the processing path of various versions of the message. Communication adaptors 336 (such as those in the current embodiment) typically precede other types of adaptors 336 according to most sets of applicable rules although that is not always the case. At some point, the adaptors 336 can then be loaded into the dynamic adapting module 308.

In the alternative, or in addition, the various adaptors 336 can be executing in the dynamic adapting module 308 more or less continuously or in some standby state (when not in use) if desired. If this situation is the case, then the dynamic adaptor selector 344 can direct the incoming message 326 (and its subsequent versions) to the first adaptor 336 in an adaptor set and activate it. Once that adaptor 336 adapts the message according to the function of the adaptor 336, the dynamic adaptor selector 344 can direct the adapted version of the message (and subsequently adapted versions) to the next adaptor 336 in the particular adaptor set. Of course, if the processing path for an incoming message branches to two or more adaptors 336, the dynamic adaptor selector 344 can direct versions of the message version at the branch to the subsequent adaptors 336 (plural) in the various parallel pathways. Thus typically, the dynamic adaptor selector 344 directs the message to one or more communication adaptors 336 first and then to other adaptors as might be desired. For instance, an incoming message 326 received in email form but destined for a recipient who prefers SMS messages might have a transformation adaptor 336 applied to it. That transformation adaptor 336 could shorten the incoming message to 140 characters or less via certain grammatical/abbreviation processes and/or add an URL (Uniform Resource Locator) or perhaps a hash tag that would lead to the text of the original incoming message 326. Thus, the communication and other adaptors 336 could be applied to the incoming message 326. See respectively references 708 and 710.

In addition, or in the alternative, the message (or various versions of it) can have a process adaptor 336 applied to it. In some cases, the process adaptor could schedule delivery of the various versions of the message to the recipients. See reference 712. At this point, in some embodiments, certain adaptors 336 related to adapting the message from/to social media 372 could be applied. For instance, a message intended for delivery via Twitter could have a communications adaptor 336 applied to it as well as a transformation adaptor 336 to shorten it to 140 characters or less. Other messages intended for delivery via communication media not ordinarily considered to convey messages per se (sirens, broadcast messages such as tornado warnings, programmable signs, etc.) could be adapted by appropriately configured adaptors 336. Note that even these communication media do convey "messages" (for instance, a siren can indicate that severe weather is approaching).

In addition, or in the alternative, certain high-level (or globally applicable) transformation adaptors 336 could adapt the message. For instance, an adaptor 336 could check for unauthorized (foul, obscene, abusive, etc.) language. Other adaptors could perform checks to determine whether proprietary or sensitive information might be contained in the message. If so delivery of the message could be stopped, the message could be censored, words could be replaced, etc. by these transformation adaptors. Moreover, these transformation adaptors could reflect certain human-level preferences for instance some users might prefer to not receive messages containing foul language.

Often, it might be desired to apply an analytic adaptor 336 to the message before it leaves the dynamic adapting module 308 or at other times. These analytic adaptors 336 typically function to instrument the message or communication system 300 such that the adaptation subsystem 302 can more easily obtain QOS metrics 312 regarding it. For instance, cookies could be added to HTML compatible message versions so that the recipient's communication device could be queried for delivery-related information. While not necessary for the practice of many embodiments, these analytic adaptors 336 can be applied as the last adaptor 336 in a particular adaptor set. See reference 718.

Once the adaptation subsystem 302 forwards the message (or rather its adapted versions) to the third-party networks 310, it can monitor the QOS metrics 312 to determine whether a communication failure 124 might have occurred (or is occurring or is about to occur) to one or more of the message versions. If so, the adaptation subsystem 302 can repeat method 700. More specifically, the adaptation subsystem 302 can be configured to maintain a backup or default set of adaptors 336 for use with a particular template or apriori message and/or for a particular senders, recipient groups, etc. These backup adaptors 336 could be applied to the incoming message 326 during another attempt to deliver the message. See reference 720 and 722. If the delivery attempt succeeds, method 700 can repeat in whole or in part. See reference 724. Otherwise method 700 can end if desired.

Embodiments allow users to communicate with each other despite their use of disparate communication technologies and their varying preferences. Moreover, embodiments reduce the time and resources users expend in doing so while reducing gaps in coverage and improving accountability. Embodiments also allow users to communicate sensitive, privileged, secure, etc. content without necessarily needing to form teams with associated access privileges to create adapted messages. Additionally, embodiments allow users to avoid (if desired) disadvantages associated with social networks and instead make mass notifications through predictable, secure, reliable, and accountable communication systems. Embodiments also provide increased visibility into the operation of communication systems by gathering QOS measurements and making the same available to various users. Embodiments also provided communication systems that dynamically adapt messages for mass notifications.

CONCLUSION

Although the subject matter has been disclosed in language specific to structural features and/or methodological acts, it is to be understood that the subject matter defined in the appended claims is not necessarily limited to the specific features or acts disclosed above. Rather, the specific features and acts described herein are disclosed as illustrative implementations of the claims.

The invention claimed is:

1. In an environment in which electronic messages are sent in a plurality of disparate source-message-types and in which disparate recipient-message-types are associated with corresponding recipients, a method comprising:
    creating an apriori library of adaptors with which to change messages from the source-message-types to the recipient-message-types;
    implementing rules pursuant to which the adaptors are to be used to change messages to adapted messages pursuant to the rules;
    accepting a third-party adaptor;
    implementing another rule pursuant to which the third-party adaptor is to be used to change an accepted message to an adapted message pursuant to the other rule;
    accepting an electronic message in one of the disparate source-message-types wherein the electronic message is a portion of a mass-emergency notification and wherein a plurality of intended recipients are associated with the electronic message wherein the accepting is via an interface;
    after accepting the electronic message, determining the intended recipients, the disparate source-message-type, and the recipient-message-types associated with the intended recipients;
    responsive to the determination of the intended recipients and the message types and using a processor, selecting a plurality of sets of adaptors to change the electronic message from the disparate source-message-type to adapted electronic messages in the disparate recipient-message-types wherein at least one set of the selected adaptors includes the third-party adaptor;
    selecting an ordering of the adaptors within each set of adaptors using the processor;
    changing the message from the disparate source-message-type to adapted electronic messages in the disparate recipient-message types using the sets of adaptors including the third-party adaptor and in the selected orderings using the processor wherein the message types correspond to arbitrary permutations of communication technologies and user preferences associated with the corresponding messages; and
    sending the adapted messages to the intended recipients in the recipient-message-types associated with the intended recipients using the processor and via the interface.

* * * * *